(12) United States Patent
Inagaki

(10) Patent No.: US 9,404,469 B2
(45) Date of Patent: Aug. 2, 2016

(54) IGNITION TIMING CONTROL DEVICE AND IGNITION TIMING CONTROL SYSTEM

(71) Applicant: NGK SPARK PLUG CO., LTD., Nagoya-shi, Aichi (JP)

(72) Inventor: Hiroshi Inagaki, Komaki (JP)

(73) Assignee: NGK SPARK PLUG CO., LTD., Aichi (JP)

(*) Notice: Subject to any disclaimer, the term of this patent is extended or adjusted under 35 U.S.C. 154(b) by 207 days.

(21) Appl. No.: 14/346,852

(22) PCT Filed: Jun. 7, 2013

(86) PCT No.: PCT/JP2013/003593
§ 371 (c)(1),
(2) Date: Mar. 24, 2014

(87) PCT Pub. No.: WO2014/068808
PCT Pub. Date: May 8, 2014

(65) Prior Publication Data
US 2015/0027409 A1    Jan. 29, 2015

(30) Foreign Application Priority Data

Oct. 31, 2012 (JP) .................. 2012-240792
Mar. 15, 2013 (JP) .................. 2013-053731

(51) Int. Cl.
*F02P 5/152* (2006.01)
*F02P 5/04* (2006.01)

(52) U.S. Cl.
CPC .............. *F02P 5/152* (2013.01); *F02P 5/045* (2013.01); *F02P 5/1523* (2013.01); *F02P 5/1526* (2013.01); *Y02T 10/46* (2013.01)

(58) Field of Classification Search
CPC ....... F02P 5/152; F02P 5/1526; F02P 5/1523; F02P 5/1525; F02P 5/045; Y02T 10/46; G01L 23/221; G01L 23/222; G01H 11/08; F02D 35/027

USPC ............ 123/406.21, 406.29, 406.34, 406.37, 123/406.38, 406.39, 406.4; 701/111; 73/35.07, 114.63, 35.11, 35.13
See application file for complete search history.

(56) References Cited

U.S. PATENT DOCUMENTS

| 6,998,846 B2* | 2/2006 | Daniels .............. F02M 25/0752 |
| | | 123/406.14 |
| 2008/0183374 A1 | 7/2008 | Ruiz |
| 2015/0233338 A1* | 8/2015 | Suzuki .................... F02P 5/152 |
| | | 123/406.37 |

FOREIGN PATENT DOCUMENTS

| CN | 1670351 A | 9/2005 |
| CN | 101235785 A | 8/2008 |

(Continued)

OTHER PUBLICATIONS

International Search Report for PCT/JP2013/003593 dated Sep. 10, 2013.

*Primary Examiner* — Hai Huynh
(74) *Attorney, Agent, or Firm* — Sughrue Mion, PLLC

(57) ABSTRACT

An ignition timing control device (31) has a knocking detection device (41) that detects knocking of internal combustion engine (1) and an ignition timing adjustment device (43) that receives a knocking signal outputted from the knocking detection device (41) and a signal concerning the ignition timing of internal combustion engine (1) outputted from an external electronic control unit (37) and adjusts the ignition timing of internal combustion engine (1) according to the knocking signal and the signal concerning the ignition timing. Further, the knocking detection device (41) and the ignition timing adjustment device (43) are electrically connected and formed integrally with each other.

19 Claims, 16 Drawing Sheets

(56) References Cited

FOREIGN PATENT DOCUMENTS

| | | |
|---|---|---|
| JP | 60-26173 A | 2/1985 |
| JP | 2001-6843 A | 1/2001 |
| JP | 2005-171997 A | 6/2005 |
| JP | 2008-215141 A | 9/2008 |

* cited by examiner

⟨ CORRECTION IGNITION TIMING CALCULATION OPERATION ⟩

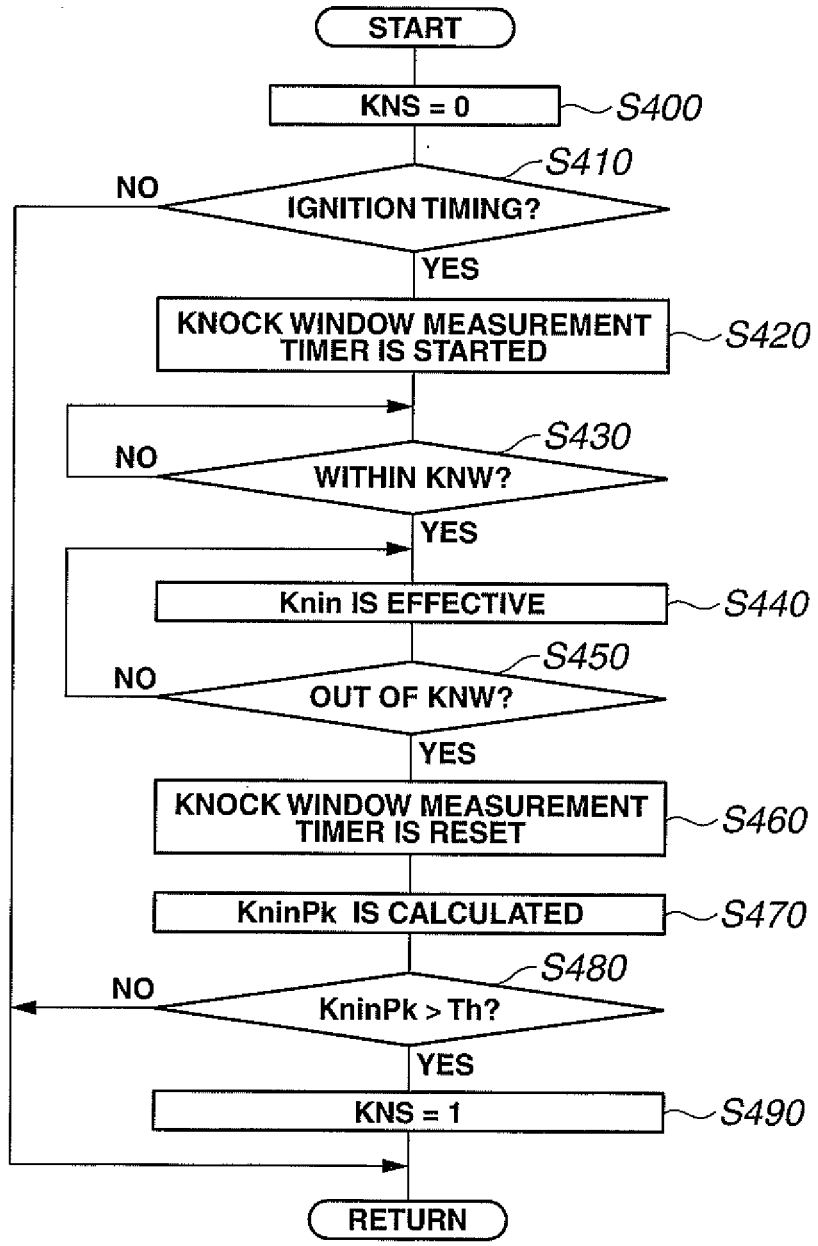

IGNITION TIMING CONTROL DEVICE AND IGNITION TIMING CONTROL SYSTEM

CROSS REFERENCE TO RELATED APPLICATIONS

This application is a National Stage of International Application No. PCT/JP2013/003593 filed Jun. 7, 2013, claiming priority based on Japanese Patent Application No. 2012-240792 filed Oct. 31, 2012 and 2013-053731 filed Mar. 15, 2013, the contents of all of which are incorporated herein by reference in their entirety.

TECHNICAL FIELD

The present invention relates to an ignition timing control device that controls an ignition timing according to a knocking state of an internal combustion engine (an engine), and relates to an ignition timing control device and an ignition timing control system that can be applied to an engine such as a general purpose engine used for, for instance, a small craft, a small generator and a lawn mower, an engine for a motorcycle and an engine used for various kinds of construction equipment.

BACKGROUND ART

As a technique of properly controlling an engine operation while preventing the knocking of the engine, a technique in which a knocking sensor is secured to the engine and an ignition timing control that controls an ignition timing on the basis of an output of the knocking sensor is performed has been known (see Patent Document 1).

This ignition timing control is a control that attempts to make full use of an engine output while preventing an occurrence of the knocking, by advancing the ignition timing step by step when the knocking is not detected by the knocking sensor, and by retarding the ignition timing when the knocking is detected.

The above ignition timing control using the output of the knocking sensor is commonly used for four-wheel vehicles. However, in a case of an engine whose structure is simple such as the general purpose engine for the small generator and the engine for the motorcycle, although an electronic controller that performs an engine control such as an engine revolution speed is used, the knocking sensor is not generally used. Thus, in the present circumstances, the ignition timing control to prevent the knocking is not carried out for such engine.

CITATION LIST

Patent Document
Patent Document 1: Japanese Patent Provisional Publication Tokkaihei No. JP2008-215141

SUMMARY OF THE INVENTION

Technical Problem

Nowadays, however, to optimize fuel economy (gas mileage) and the engine output, a precise ignition control is required even for the engine having the simple structure such as the general purpose engine and the motorcycle engine.

As a solution for this requirement, it is conceivable that the knocking sensor will be mounted then the above ignition timing control will be performed. However, the following problem arises.

That is, in a case where the knocking sensor is secured to the general purpose engine and the motorcycle engine in current use and the ignition timing control is performed, redesign to perform the ignition timing control is necessary for the electronic controller that performs the conventional engine control. Thus, this causes enormous work (man-hour) and cost.

The present invention is made for solving the above problem, and an object of the present invention is to provide an ignition timing control device and an ignition timing control system which are capable of performing the ignition timing control that easily suppresses the occurrence of the knocking for the internal combustion engine that has no function of the ignition timing control suppressing the occurrence of the knocking.

Solution to Problem (1) In the invention, as a first configuration, an ignition timing control device has: a knocking detection device that detects knocking of an internal combustion engine; and an ignition timing adjustment device that adjusts an ignition timing of the internal combustion engine on the basis of a knocking signal indicating a knocking state which is obtained from the knocking detection device and a signal concerning the ignition timing of the internal combustion engine which is obtained from an external electronic control unit, and
the knocking detection device and the ignition timing adjustment device are electrically connected and formed integrally with each other.

In the ignition timing control device of the first configuration, the knocking detection device and the ignition timing adjustment device are electrically connected and formed integrally with each other. Further, the knocking signal from the knocking detection device and the signal concerning the ignition timing from the external electronic control unit are inputted to the ignition timing adjustment device.

Therefore, the ignition timing adjustment device can adjust the ignition timing (correct the ignition timing, e.g. advance or retard the ignition timing) so as to achieve a proper ignition timing on the basis of the knocking signal obtained from the knocking detection device and the signal concerning the ignition timing obtained from the external electronic control unit.

Especially in the first configuration, the ignition timing control device can be applied to an engine that is not undergone the knocking control such as the conventional general purpose engine and motorcycle engine. That is, only by adding the ignition timing control device of the first configuration to the conventional configuration of the electronic control unit that performs the engine control, redesign to perform the ignition timing control in the electronic control unit is not required. This gives rise to significant effects of greatly reducing work (man-hour) and cost of the redesign.

Here, the external electronic control unit is an electronic control unit that is provided separately from the ignition timing control device of the first configuration. For instance, it is an electronic control device (an engine control unit) that comprehensively controls an operating condition of the internal combustion engine. Further, the signal concerning the ignition timing is a signal that includes information about the ignition timing. For instance, it is a reference ignition signal indicating a timing that is a reference of the ignition timing.

(2) In the invention, as a second configuration, the knocking detection device and the ignition timing adjustment device are formed integrally with each other in an unseparatable manner.

In the second configuration, since the knocking detect ion device and the ignition timing adjustment device are formed integrally with each other in the unseparatable manner, this configuration resists damage and handling becomes easy. Also, this configuration resists receiving external (or outside) noises.

Here, the unseparatable manner means that separation between the both devices is impossible unless the devices are broken (because the second configuration is not based on the premise that the devices are separate from each other).

(3) In the invention, as a third configuration, the knocking detection device and the ignition timing adjustment device are fixedly connected so as to be able to be attached to and detached from each other.

In the third configuration, the knocking detection device and the ignition timing adjustment device are fixedly connected so as to be able to be attached to and detached from each other. Thus, in a case where either one of the knocking detection device and the ignition timing adjustment device fails, after detaching or separating these devices from each other, only the failed device can be replaced, which is advantage of the present configuration.

(4) In the invention, as a fourth configuration, the knocking detection device and the ignition timing adjustment device are formed integrally with each other through a connecting cable.

In the fourth configuration, since the knocking detection device and the ignition timing adjustment device are formed integrally with each other through the connecting cable, it is possible to arrange the knocking detection device and the ignition timing adjustment device with these devices being separated from each other by a length of the connecting cable.

The knocking detection device is usually fixed to a cylinder block etc. of the internal combustion engine, and a temperature of the internal combustion engine is high and the internal combustion engine produces great vibrations.

Thus, by arranging the knocking detection device and the ignition timing adjustment device through the connecting cable, influence of heat and vibration (of the internal combustion engine) on the ignition timing adjustment device can be reduced. Hence, it is possible to effectively suppress an occurrence of failure of the ignition timing adjustment device.

(5) In the invention, as a fifth configuration, the ignition timing adjustment device is installed in the knocking detection device.

In the fifth configuration, since the ignition timing adjustment device is installed in the knocking detection device, the device can be formed into a compact shape.

(6) In the invention, as a sixth configuration, the signal concerning the ignition timing is a reference ignition signal indicating a timing that is a reference of the ignition timing.

In the sixth configuration, as the signal concerning the ignition timing, the reference ignition signal (e.g. an after-mentioned ignition signal (A)) can be used.

(7) In the invention, as a seventh configuration, the ignition timing adjustment device receives a signal including information about whether the adjustment of the ignition timing is permitted from the external electronic control unit, and judges on the basis of the signal whether or not the adjustment of the ignition timing is performed.

In the seventh configuration, the ignition timing adjustment device can judge whether or not the adjustment of the ignition timing is performed on the basis of the signal including information about whether the adjustment of the ignition timing is permitted which is obtained from the external electronic control unit.

As this information, for instance, it is information that indicates a state in which temperature of cooling water for the internal combustion engine is high and the knocking tends to occur.

Therefore, the ignition timing is not adjusted when a condition of the internal combustion engine is not favorable for the adjustment (advancing) of the ignition timing (when the knocking tends to occur), and thus the occurrence of the knocking can be properly suppressed.

(8) In the invention, as an eighth configuration, the signal concerning the ignition timing of the internal combustion engine which is sent from the external electronic control unit to the ignition timing adjustment device includes the information about whether the adjustment of the ignition timing is permitted.

In the eighth configuration, the signal concerning the ignition timing of the internal combustion engine includes the information about whether the adjustment of the ignition timing is permitted. Thus, as compared with a case where this information is sent by other signal, the configuration can be simplified.

(9) In the invention, as a ninth configuration, the signal concerning the ignition timing of the internal combustion engine is a signal that indicates, by change of a status of the signal in itself, whether the adjustment of the ignition timing is permitted.

In the ninth configuration, the information is transmitted by the change of the signal in itself.

(10) In the invention, as a tenth configuration, the change of the status of the signal concerning the ignition timing of the internal combustion engine is change of a duration time of a high level or a low level of the signal.

The tenth configuration shows, as an example, the change of the signal for the transmission of the information.

In this configuration, since the information is transmitted by a state of high level and low level of the signal (namely a width of the signal such as a rectangular signal), the information can be transmitted by a conventional configuration that sends and reads the signal, and this has the advantage of eliminating the need to change a hardware configuration.

(11) In the invention, as an eleventh configuration, the change of the status of the signal concerning the ignition timing of the internal combustion engine is change of voltage of the signal.

The eleventh configuration shows, as an example, the change of the signal for the transmission of the information.

In this configuration, the information can be transmitted by a magnitude or level of voltage of the signal (e.g. by a height of high level of the signal).

(12) In the invention, as a twelfth configuration, besides a signal line for sending the signal concerning the ignition timing of the internal combustion engine from the external electronic control unit, a judgment signal line for sending a judgment signal that indicates whether the adjustment of the ignition timing is permitted from the external electronic control unit is connected to the ignition timing adjustment device.

The twelfth configuration shows, as an example, the configuration in which besides the signal line for sending the signal concerning the ignition timing, the judgment signal line for sending the judgment signal that indicates whether the adjustment of the ignition timing is permitted is provided.

(13) In the invention, as a thirteenth configuration, in a case where the ignition timing adjustment device judges, on the basis of the signal including the information about whether the adjustment of the ignition timing is permitted which is received from the external electronic control unit, that there is no need to adjust the ignition timing, the ignition timing adjustment device performs a control of the ignition timing of the internal combustion engine using the signal concerning the ignition timing of the internal combustion engine obtained from the external electronic control unit.

In the thirteenth configuration, in the case where there is no need to adjust the ignition timing, the control of the ignition timing is carried out using the signal concerning the ignition timing (for instance, by feeding the signal to an igniter with the signal passing through the ignition timing adjustment device).

Thus, in an operating region (or an operating area) where the advancing of the ignition timing is not needed, the ignition control can be carried out using the conventional system as it is (using the signal concerning the ignition timing outputted from the external device), then the whole system can be simplified without sophisticating the configuration of the ignition timing adjustment device, which is advantage of this configuration.

(14) In the invention, as a fourteenth configuration, an ignition timing control system provided with the ignition timing control device and the external electronic control unit which are described in any one of the preceding configurations 7 to 13, the external electronic control unit has: a judging unit that judges whether or not an operating condition of the internal combustion engine is in a timing in which the adjustment of the ignition timing is permitted; and a transmitting unit that, when the judgment as to whether or not the operating condition is in the timing in which the adjustment of the ignition timing is permitted is made by the judging unit, transmits a signal that includes information indicating whether the operating condition is in the timing in which the adjustment of the ignition timing is permitted to the ignition timing adjustment device.

In the ignition timing control system of the present invention, the external electronic control unit judges whether or not the operating condition is in the timing in which the adjustment of the ignition timing is permitted, and on the basis of the judgment result, the external electronic control unit transmits the signal that includes information indicating whether the operating condition is in the timing in which the adjustment of the ignition timing is permitted to the ignition timing adjustment device.

Therefore, the ignition timing is not adjusted when a condition of the internal combustion engine is not favorable for the adjustment (advancing) of the ignition timing (when the knocking tends to occur), and the occurrence of the knocking can be properly suppressed.

BRIEF DESCRIPTION OF THE DRAWINGS

FIG. 8 is a flow chart showing a knocking detecting operation executed in the ignition timing adjustment device of the embodiment 1.

EMBODIMENTS FOR CARRYING OUT THE INVENTION

In the following description, embodiments of an ignition timing control device of the present invention will be explained with reference to the drawings.

Embodiment 1

An ignition timing control device of the present embodiment is a device that is used for various engines (various internal combustion engines) such as the general purpose engine and the motorcycle engine and controls the ignition timing in order to prevent the knocking of the internal combustion engine. In the following description, the ignition timing control device will be explained with a four-cycle motorcycle engine taken for example.

a) First, a general system of the internal combustion engine that is provided with the ignition timing control device of the present embodiment will be explained.

Figure 1:
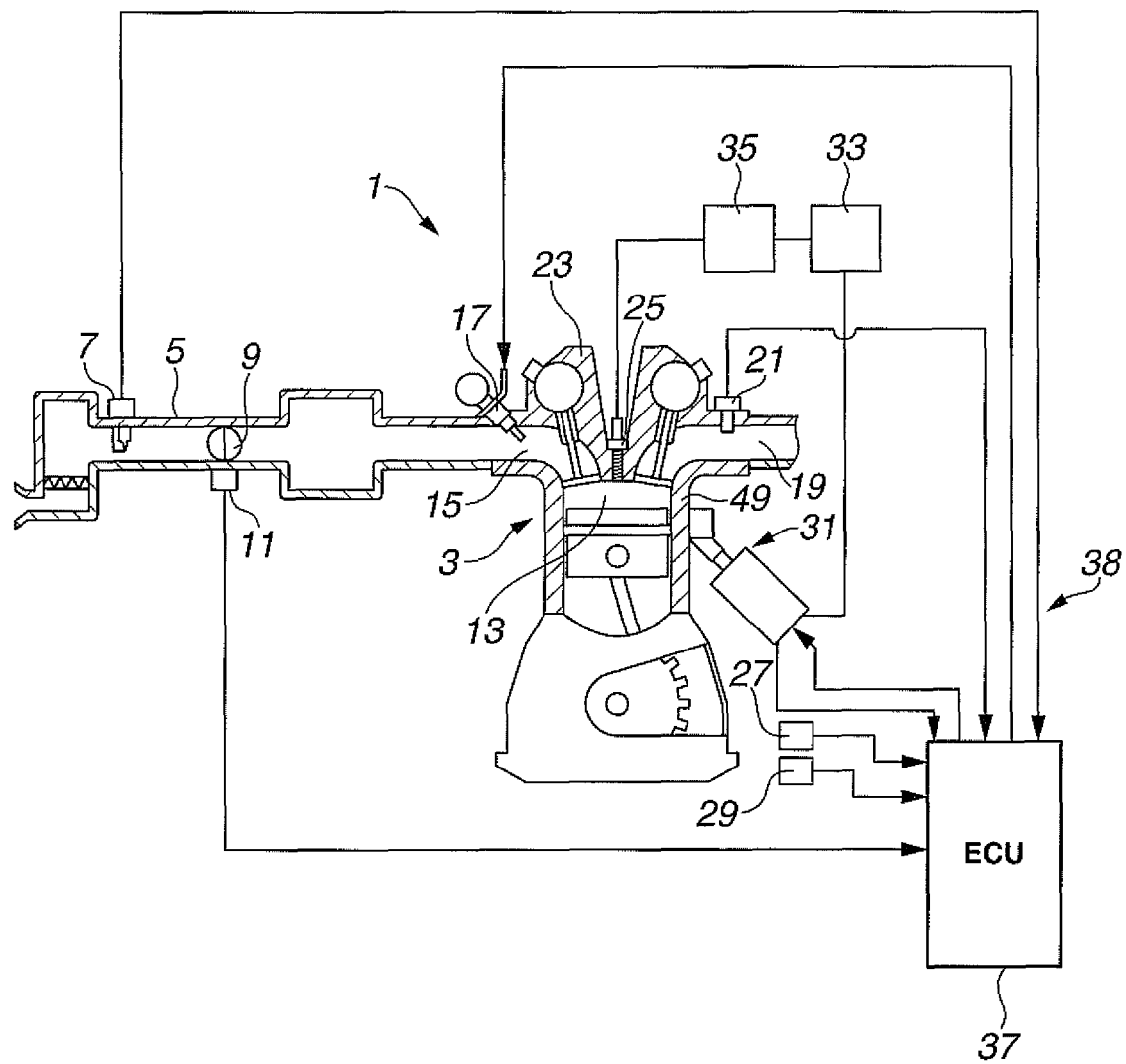
FIG. 1 is an explanatory drawing showing a system configuration of an internal combustion engine in which an ignition timing control device of an embodiment 1 is used.

As shown in FIG. 1, the internal combustion engine (the engine) 1 has an engine body 3, an intake pipe 5 that introduces air into the engine body 3, an air flow meter 7 that detects a suction air quantity, a throttle valve 9 that regulates the suction air quantity, a throttle opening sensor 11 that detects an opening of the throttle valve 9, an intake manifold 15 that introduces the air into a combustion chamber 13, a fuel injection valve 17 that jets or sprays fuel in the intake manifold 15, an exhaust manifold 19 that exhausts the air (after combustion) from the engine body 3, an air fuel ratio sensor (or an oxygen sensor) 21 that detects an air fuel ratio from the exhaust exhausted from the exhaust manifold 19, etc. . . .

Further, an ignition plug 25 is fixed to a cylinder head 23 of the engine body 3, and an engine revolution speed sensor 27 that detects an engine revolution speed (a rotation speed) and a crank angle sensor 29 that detects a crank angle are fixed to the engine body 3.

Furthermore, an after-mentioned ignition timing control device 31 is installed at the engine body 3. This ignition timing control device 31 connects to an igniter 33, the igniter 33 connects to an ignition coil 35, and the ignition coil 35 connects to the ignition plug 25.

In addition, the internal combustion engine 1 is provided with an internal combustion engine control device (an engine control unit) 37 that comprehensively controls an operating condition (e.g. an air fuel ratio feedback control based on the engine revolution speed and an output of the air fuel ratio sensor 21) of the engine body 3 etc. This internal combustion engine control device 37 is an electronic control unit (ECU) provided with a microcomputer having well-known RAM, ROM, CPU, etc. (all not shown).

Here, this internal combustion engine control device 37 corresponds to an external electronic control unit of the present invention. Further, in the following description, a system having the ignition timing control device 31 and the internal combustion engine control device 37 is called an ignition timing control system 38.

The air flow meter 7, the throttle opening sensor 11, the air fuel ratio sensor 21, the engine revolution speed sensor 27, the crank angle sensor 29 and the ignition timing control device 31 are connected to an input port (not shown) of the internal combustion engine control device 37, and each signal (such as a sensor signal) from these sensors and device is inputted to the input port.

On the other hand, the fuel injection valve 17 and the ignition timing control device 31 are connected to an output port (not shown) of the internal combustion engine control device 37, and each control signal to control operation of each device is outputted from the internal combustion engine control device 37 to these devices.

b) Next, the ignition timing control device 31 of the present embodiment will be explained.

Figure 2A:
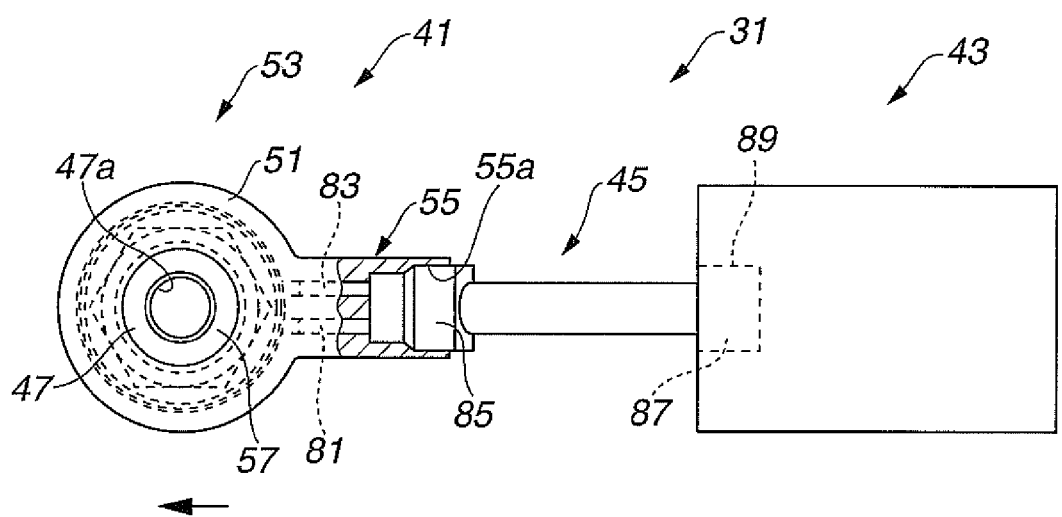
FIG. 2A is a plan view showing the ignition timing control device of the embodiment 1 with a part of the ignition timing control device removed.

As shown in FIG. 2, the ignition timing control device 31 of the present embodiment is a device formed from a knocking detection device 41 and an ignition timing adjustment device 43 that are formed integrally with each other in an electrically and mechanically unseparatable (undetachable) manner through a connecting cable 45.

The knocking detection device 41 is a non-resonant type knocking sensor using a well-known piezoelectric element 65. The knocking detection device 41 has a structure in which a fixing bolt (not shown) is inserted into an axis hole 47a of a mount metal 47, and the knocking detection device 41 is fixed to a cylinder block 49 (see FIG. 1) of the engine body 3 with the fixing bolt.

More specifically, the knocking detection device 41 is almost entirely molded by a resin molding member 51, and the knocking detection device 41 has a substantially cylindrical body portion 53 and a substantially rectangular parallelepiped connector portion 55 that protrudes from a side surface of the body portion 53.

Figure 2B:
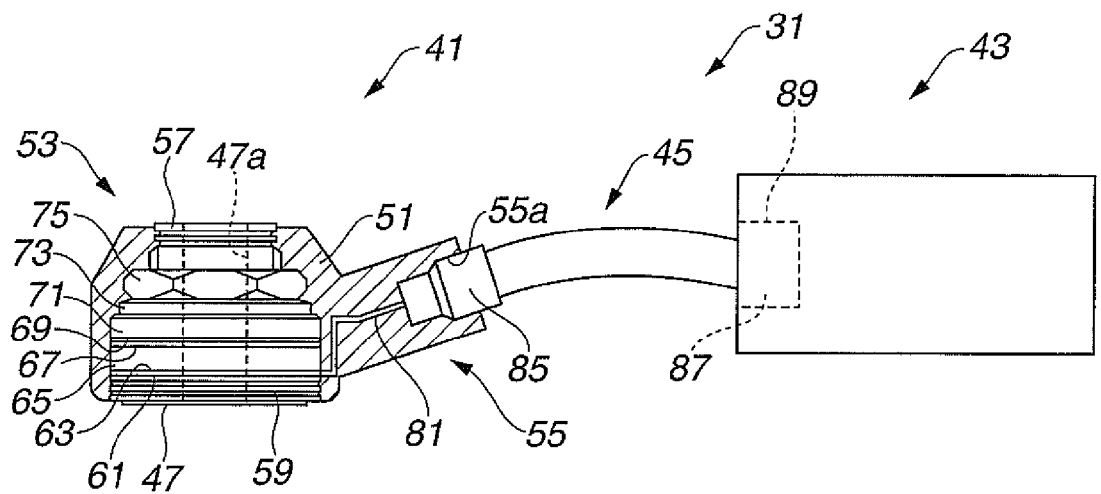
FIG. 2B is a front view showing the ignition timing control device with a part of the ignition timing control device removed.

The body portion 53 has the mount metal 47 that is formed from a cylinder portion 57 having a cylindrical shape and a ring-shaped brim portion 59 provided at one end side of the cylinder portion 57 (at a lower side in FIG. 2B). A ring-shaped first insulating plate 61, a ring-shaped first electrode plate 63, the ring-shaped piezoelectric element 65, a ring-shaped second electrode plate 67, a ring-shaped second insulating plate 69, a ring-shaped weight 71, a ring-shaped disc spring 73 and a ring-shaped nut 75 are disposed at the cylinder portion 57 from a brim portion 59 side. A first output terminal 81 and a second output terminal 83 to take an output signal generated between the both electrode plates 63, 67 are connected to the first electrode plate 63 and the second electrode plate 67 respectively.

The ignition timing adjustment device 43 is a control device that adjusts the ignition timing. As same as the internal combustion engine control device 37, the ignition timing adjustment device 43 is an electronic control unit provided with a microcomputer (not shown) having well-known RAM, ROM, CPU, etc.

The connecting cable 45 is a cable that is provided inside thereof with electrical wirings (not shown) connecting to the first output terminal 81 and the second output terminal 83. A first connecter 85 and a second connecter 87, each of which is connected to the both electrical wirings, are provided at both ends of this connecting cable 45.

That is, the first connecter 85 is fitted or inserted into (or mounted to) an opening 55a of the connector portion 55 of the knocking detection device 41, and the electrical wirings are connected to the respective first and second output terminals 81, 83. The second connecter 87 is fitted or inserted into (or mounted to) a hollow-shaped connecter portion 89 of the ignition timing adjustment device 43, and the electrical wirings are connected to inside wirings (not shown) of the ignition timing adjustment device 43.

Especially in the present embodiment, the first connecter 85 of the connecting cable 45 is configured so that the first connecter 85 is fitted or inserted into (or mounted to) the connector portion 55 of the knocking detection device 41 and also is integrally fixed to the connector portion 55 with an adhesive in the unseparatable (undetachable) manner. Likewise, the second connecter 87 of the connecting cable 45 is configured so that the second connecter 87 is fitted or inserted into (or mounted to) the connecter portion 89 of the ignition timing adjustment device 43 and also is integrally fixed to the connecter portion 89 with the adhesive in the unseparatable (undetachable) manner.

c) Next, an electrical configuration of the ignition timing control device 31 will be explained.

Figure 3A:
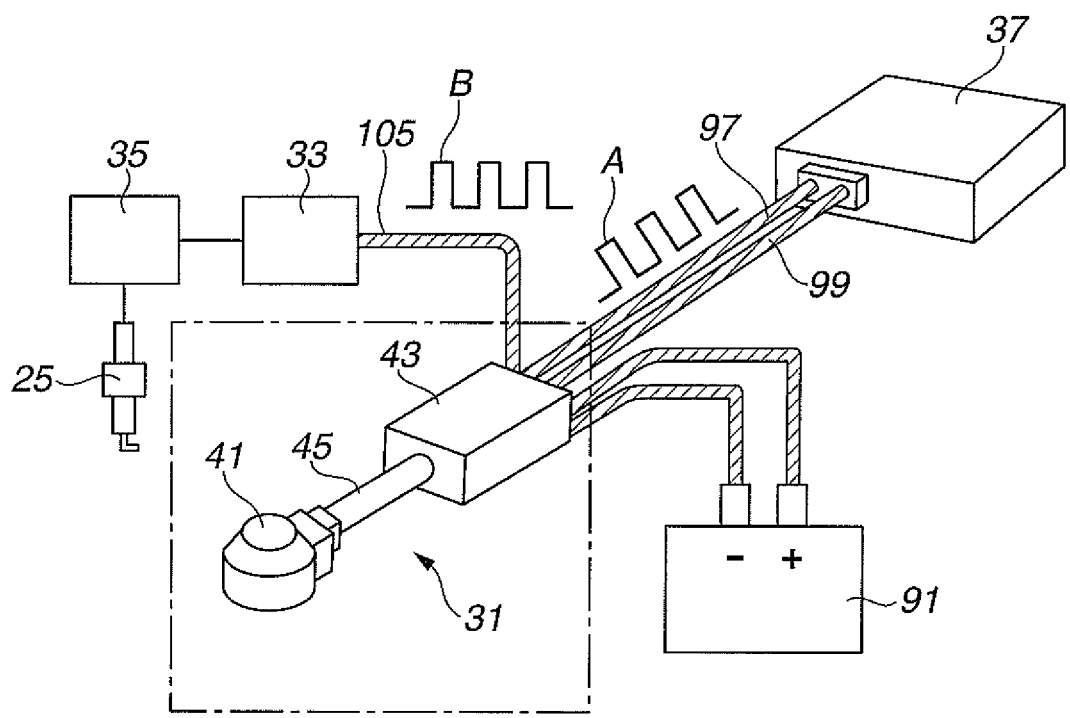
FIG. 3A is an explanatory drawing showing the ignition timing control device and its peripheral devices, of the embodiment 1.
Figure 3B:
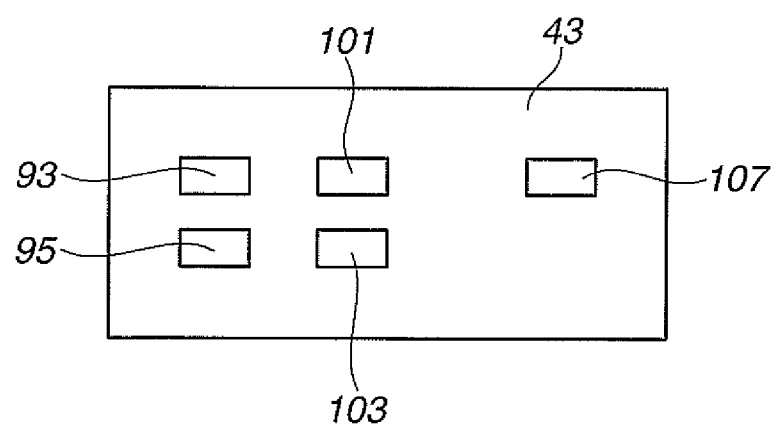
FIG. 3B is an explanatory drawing showing a connection terminal of an ignition timing adjustment device of the ignition timing control device.

As shown in FIG. 3, the ignition timing adjustment device 43 of the ignition timing control device 31 operates by receiving supply of power from a battery 91. Thus the ignition timing adjustment device 43 is provided with a pair of power supply terminals 93, 95 for receiving the power from the battery 91.

Further, the ignition timing adjustment device 43 is connected to the internal combustion engine control device 37 through a set of lead wires (signal wires) 97, 99 so as to be able to be attached to and detached from the internal combustion engine control device 37. Here, the lead wires 97, 99 can be attached to and detached from each of the ignition timing adjustment device 43 and the internal combustion engine control device 37.

The ignition timing adjustment device 43 has a reception terminal 101 to receive an after-mentioned ignition signal (A) from the internal combustion engine control device 37 and an output terminal 103 that outputs a signal indicating a failure (a defective condition) of the knocking detection device 41 or the ignition timing adjustment device 43 (this detailed explanation is omitted here) from the ignition timing adjustment device 43 to the internal combustion engine control device 37.

Further, the ignition timing adjustment device 43 connects to the igniter 33 through a lead wire 105. The ignition timing adjustment device 43 is provided with an ignition terminal 107 to output a signal for actuating the ignition coil 35, namely an after-mentioned ignition signal (B) (a post-adjustment ignition signal (B)), to the igniter 33.

Figure 4:
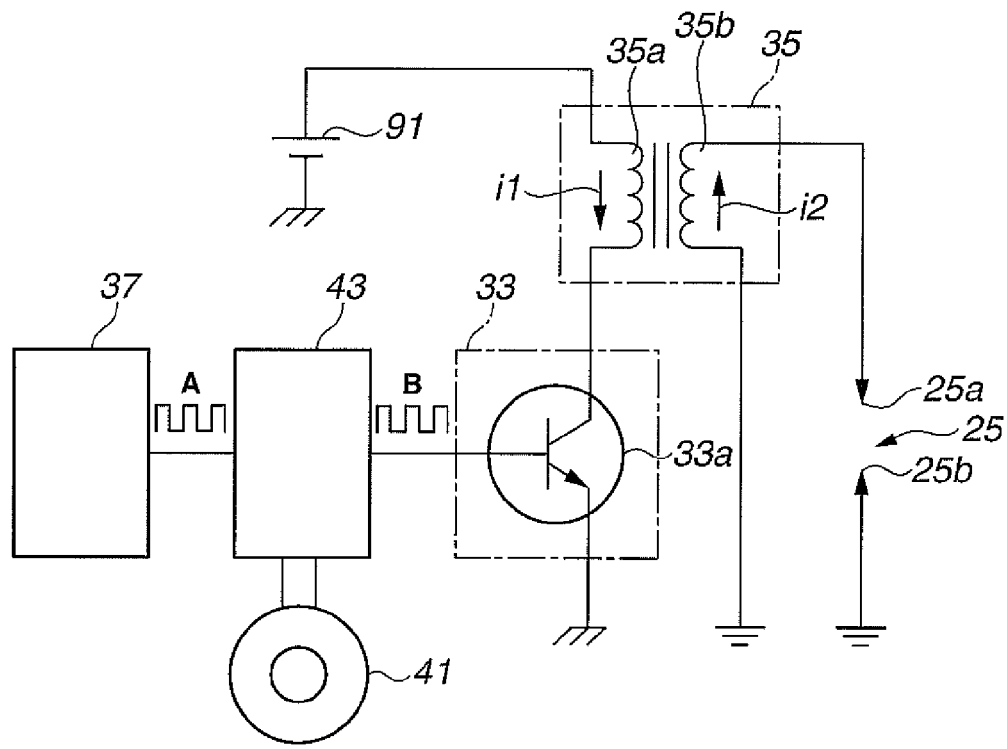
FIG. 4 is an explanatory drawing showing an electrical configuration of the ignition timing control device and its peripheral devices of the embodiment 1.

More specifically, as shown in FIG. 4, the ignition coil 35 has a primary winding 35a and a secondary winding 35b, and one end of the primary winding 35a is connected to a positive electrode of the battery 91, and the other end of the primary winding 35a is connected to a collector of an npn-type power transistor 33a (of the igniter 33). This power transistor 33a is a switching element that performs switching-on/off of current-carry to the primary winding 35a. An emitter of the power transistor 33a is earthed to a ground, which is the same electric potential as a negative electrode of the battery 91.

On the other hand, one end of the secondary winding 35b is earthed to the ground, which is the same electric potential as the negative electrode of the battery 91. The other end of the secondary winding 35b is connected to a center electrode 25a of the ignition plug 25. A ground electrode 25b of the ignition plug 25 is earthed to the ground, which is the same electric potential as the negative electrode of the battery 91.

In the present embodiment, the internal combustion engine control device 37 and the ignition timing adjustment device 43 are connected, and the ignition signal (B) is outputted from this ignition timing adjustment device 43 to a base of the power transistor 33a. Then, the power transistor 33a performs the switching operation on the basis of this ignition signal (B), and on/off of the current-carry to the primary winding 35a of the ignition coil 35 is switched.

d) Next, a basic operation of the ignition timing control using the ignition timing control device 31 described above will be explained.

The internal combustion engine control device 37 determines a reference ignition timing that becomes a reference of the ignition timing on the basis of, for instance, the engine revolution speed and/or the suction air quantity. This reference ignition timing is a base ignition timing (namely an ignition timing that is an object of the adjustment by the ignition timing adjustment device 43, i.e. the ignition timing that undergoes the adjustment by the ignition timing adjustment device 43) that is set, using a map in which a plurality of ignition timings having such adequate margin that the internal combustion engine 1 is not broken or damaged even when taking account of variations of each internal combustion engine 1 and climatic change etc. are set for each operating condition of the internal combustion engine 1, by comparing a current operating condition with this map (by checking a current operating condition against this map).

Figure 5:
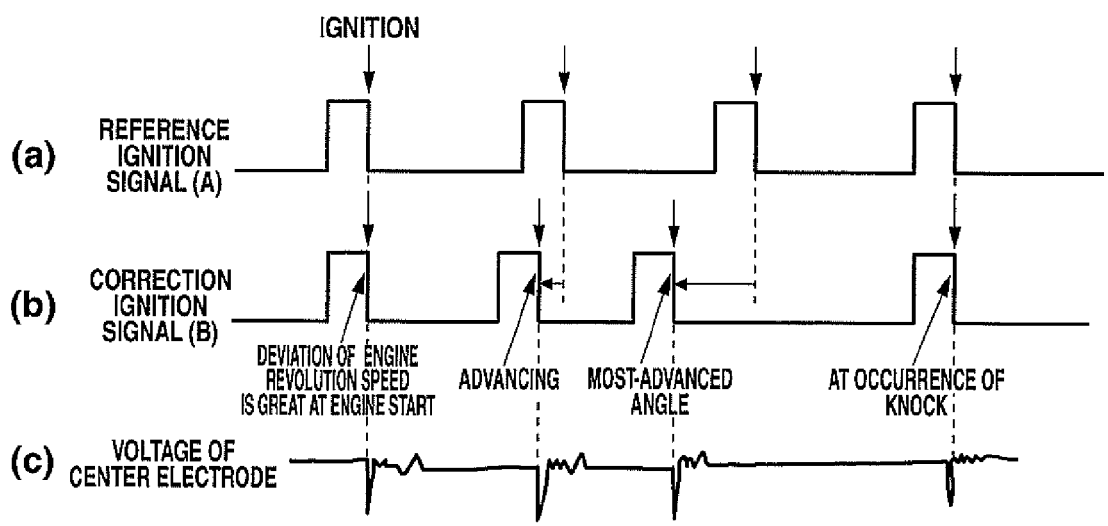
FIG. 5 is an explanatory drawing showing a relationship between a reference ignition signal, a correction ignition signal and a voltage of a center electrode.

Here, a signal that indicates this reference ignition timing is a reference ignition signal (i.e. the ignition signal (A): see FIG. 5(*a*)). This reference ignition signal (A) is outputted to the ignition timing adjustment device 43.

The ignition timing adjustment device 43 that receives the reference ignition signal (A) receives a signal (a knocking signal) from the knocking detection device 41, and detects the presence or absence of an occurrence of the knocking (a knock) on the basis of the knocking signal. The ignition timing adjustment device 43 judges the presence or absence of the knocking on the basis of, for instance, a magnitude or level of a peak value of the knocking signal.

Then, the ignition timing adjustment device 43 adjusts (corrects) the ignition timing in accordance with a knocking occurrence state etc., and determines a correction ignition timing. A signal that indicates this correction ignition timing is a correction ignition signal (i.e. the ignition signal (B): see FIG. 5(*b*)).

Figure 6:
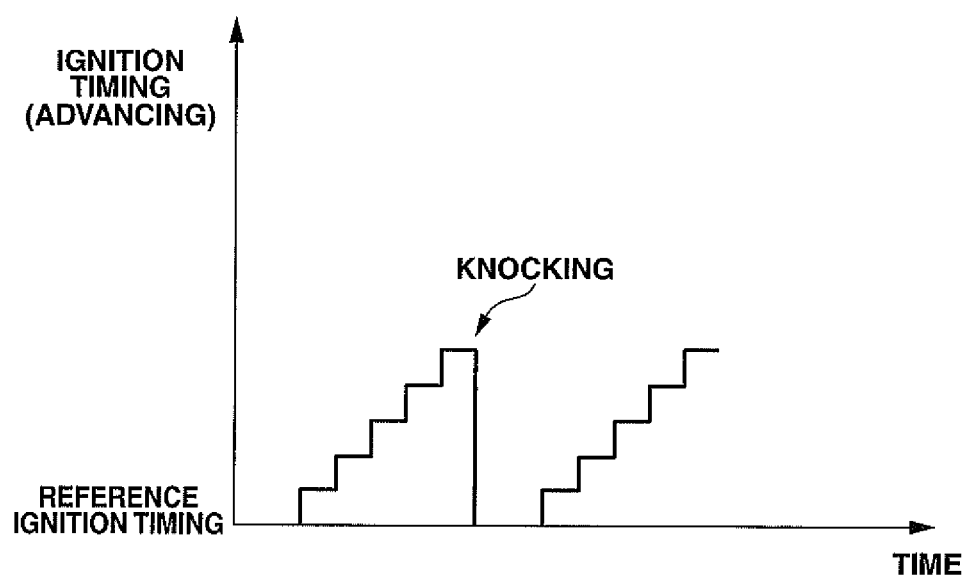
FIG. 6 is a graph showing a state of adjustment of an ignition timing by advancing and retarding the ignition timing.

More specifically, as shown in FIG. 6, the correction ignition timing is set so that when the knocking does not occur, the ignition timing is gradually advanced to a most-advanced angle at a predetermined time interval, and when the knocking occurs, the ignition timing is returned to the reference ignition timing. Here, as shown in FIG. 5, in a case where a change of the engine revolution speed is great, e.g. in transition of the engine condition such as during an engine start and acceleration, the operation correcting the ignition timing is not carried out.

Subsequently, when the correction ignition timing is determined as described above, as shown in FIG. 4, the correction ignition signal (B) is outputted from the ignition timing adjustment device 43 to the igniter 33.

In the igniter 33, when the correction ignition signal (B) is provided to the base of the power transistor 33a, the switching operation is performed according to ON/OFF of this correction ignition signal (B).

As will be explained in detail, in a case where the correction ignition signal (B) is OFF (a low level: generally, a ground potential), a base current does not flow and the power transistor 33a is in an OFF state (a cutoff state), then a current (a primary current i1) does not flow in the primary winding 35a. In a case where the correction ignition signal (B) is ON (a high level: a state in which a positive voltage is applied from the ignition timing adjustment device 43), the base current flows and the power transistor 33a is in an ON state (a current-carrying state), then the current (the primary current i1) flows in the primary winding 35a. By this current-carry to the primary winding 35a, a magnetic flux energy is stored in the ignition coil 35.

Further, when the correction ignition signal (B) becomes the low level in the state in which the correction ignition signal (B) is the high level and the primary current i1 flows in the primary winding 35a, the power transistor 33a is brought into the OFF state, and the current-carry of the primary current i1 to the primary winding 35a is interrupted (stopped). Then, a magnetic flux density in the ignition coil 35 abruptly changes, and an ignition voltage is produced at the secondary winding 35b and also this voltage is applied to the ignition plug 25. By this voltage application, spark discharge occurs between the center electrode 25a and the ground electrode 25b of the ignition plug 25 (see FIG. 5(*c*)). Here, a current that flows in the secondary winding 35b at this time is a secondary current i2.

The reference ignition signal (A) and the correction ignition signal (B) each include information of a timing of change from the low level to the high level and a timing of change from the high level to the low level. The timing of change from the high level to the low level is a desired ignition timing (a timing at which the ignition plug 25 ignites). Further, regarding a period of the high level, a predetermined period is set so that a necessary magnetic flux energy is stored.

d) Next, an operation executed in the ignition timing adjustment device 43 will be explained.

<Correction Ignition Timing Calculating Operation>

This operation is an operation in which the correction ignition timing is calculated on the basis of the reference ignition signal (A) and also the engine revolution speed is calculated using the reference ignition signal (A).

Figure 7:
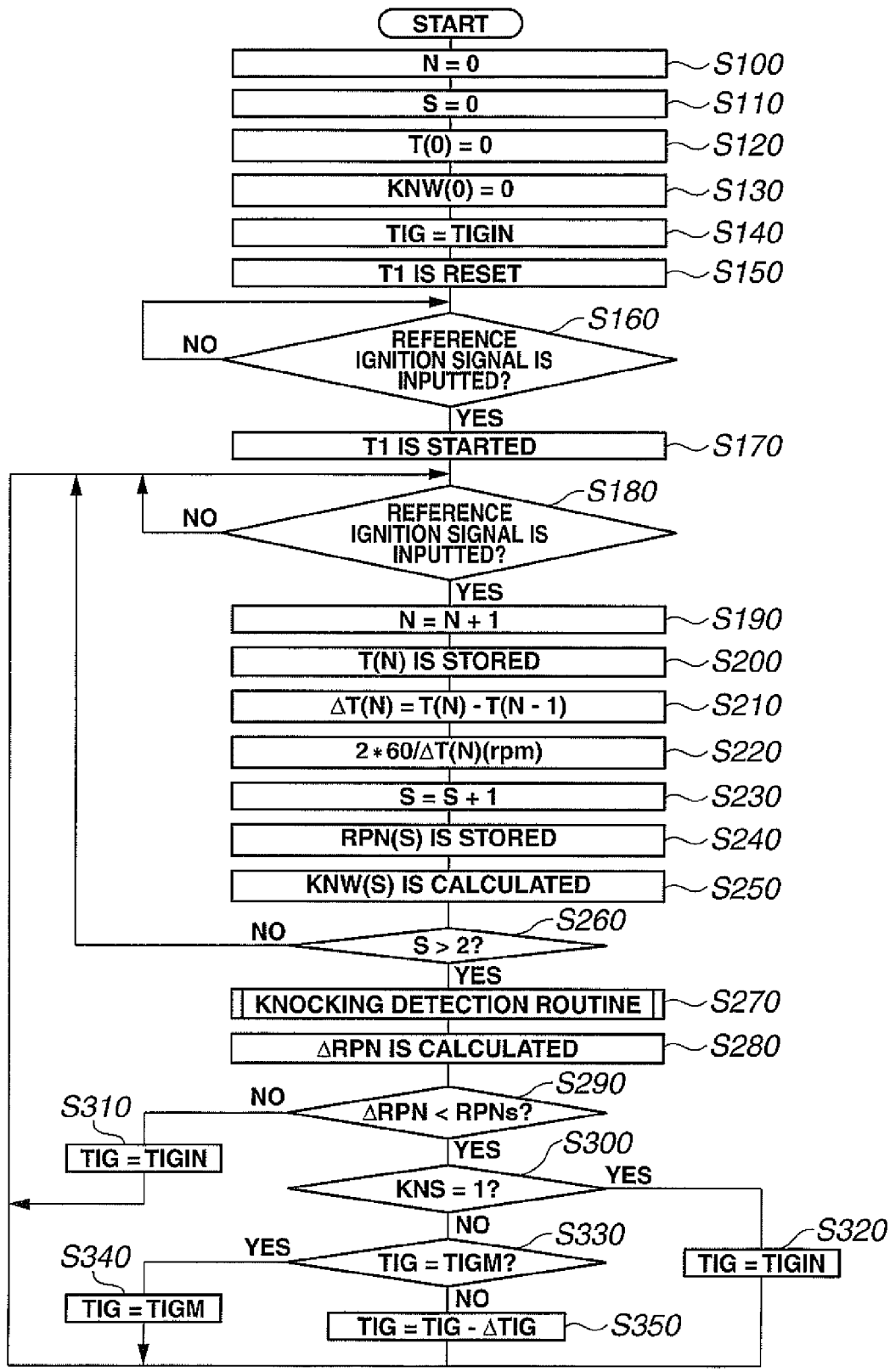
FIG. 7 is a flow chart showing a correction ignition timing calculating operation executed in the ignition timing adjustment device of the embodiment 1.

As shown in a flow chart in FIG. 7, at step S100, a timer memory variable N is reset (is set to 0).

At step S110, a revolution speed store/knock window (Window) variable S is reset. This revolution speed store/knock window variable S is a variable that indicates a time series when the engine revolution speed is stored in sequence at step S240 and also a variable that indicates a time series when a value of a crank angle window that detects the knocking is stored in sequence at step S250.

At subsequent step S120, an initial value T(0) of a timer T is set to 0.

At subsequent step S130, an initial value KNW(0) of a knock detection window KNW is set to 0. This knock detection window KNW indicates an area or a region (a predetermined rotation angle range or section) where there is a possibility that the knocking will occur, and the knock detection window KNW corresponds to a certain period that is set with the ignition timing being a starting point and corresponds to an analysis section of the knocking signal.

At subsequent step S140, on the basis of the reference ignition signal (A) received from the internal combustion engine control device 37, a reference ignition timing (an input ignition timing) TIGIN is set as a correction ignition timing TIG. Here, the correction ignition timing TIG here is a value that is not corrected yet.

At subsequent step S150, an ignition signal interval measurement timer T1 is reset.

At subsequent step S160, a judgment is made as to whether or not the reference ignition signal (A) is inputted. If an affirmative judgment is given here, the routine proceeds to step S170. If a negative judgment is given, the routine stands by here.

At step S170, in order to measure a time from the input of the reference ignition signal (A), the ignition signal interval measurement timer T1 is started.

At subsequent step S180, a judgment is made as to whether or not the reference ignition signal (A) is inputted again. If an affirmative judgment is given here, the routine proceeds to step S190. If a negative judgment is given, the routine stands by here.

At step S190, since the reference ignition signal (A) is inputted, count-up of the timer memory variable N is performed.

At subsequent step S200, a time when the reference ignition signal (A) is inputted this time (Nth) is stored as a timer T(N). That is, a count value of the ignition signal interval measurement timer T1 is stored as a value of the timer T(N).

At subsequent step S210, a difference ΔT(N) between the time (T(N)) when the reference ignition signal (A) is inputted this time (Nth) and a time (T(N−1)) when the reference ignition signal (A) is (was) inputted last time (N−1th) is determined. That is, a time between successive reference ignition signals (A) is determined.

At subsequent step S220, the engine revolution speed (rpm) is calculated by calculation of "2 rotations×60 sec/ΔT(N)" (in a case of 1 ignition/2 rotations in the four-cycle engine).

At subsequent step S230, count-up of the revolution speed store/knock window variable S is performed.

At subsequent step S240, the engine revolution speed calculated at step S220, namely the engine revolution speed corresponding to the revolution speed store/knock window variable S, is stored (memorized) as an RPN(S).

At subsequent step S250, calculation of the knock detection window KNW(S) is performed. That is, calculation of the knock detection window KNW(S) corresponding to the revolution speed store/knock window variable S is performed by a well-known calculating method, and its value is stored.

At subsequent step S260, a judgment is made as to whether or not the revolution speed store/knock window variable S is greater than 2. If an affirmative judgment is given here, the routine proceeds to step S270. If a negative judgment is given, the routine is returned to step S180.

At step S270, an after-mentioned knocking detection operation is executed, and the knocking is detected.

At subsequent step S280, a deviation of the engine revolution speed (a revolution speed deviation) ΔRPN that indicates a magnitude of the change of the engine revolution speed is calculated by calculation of "RPNS (S)/RPNS (S−1)" of the engine revolution speed, namely by dividing the engine revolution speed RPNS(S) this time (Sth) by the engine revolution speed RPNS (S−1) last time (S−1th).

At subsequent step S290, a judgment is made as to whether or not the revolution speed deviation ΔRPN is smaller than a predetermined judgment value (a predetermined criteria) RPNs. If an affirmative judgment is given here, the routine proceeds to step S300. If a negative judgment is given, the routine proceeds to step S310.

At step S310, since the revolution speed deviation ΔRPN is great and the advancing of the ignition timing is not proper, the reference ignition timing TIGIN in itself is set as the correction ignition timing TIG, and the routine is returned to step S180.

On the other hand, at step S300, a judgment is made as to whether or not the knocking occurs according to whether or not an after-mentioned knock detection flag KNS that is set in the knocking detection operation is 1. If an affirmative judgment is given here, the routine proceeds to step S320. If a negative judgment is given, the routine proceeds to step S330.

At step S320, since the knocking occurs, in order to prevent the occurrence of the knocking, the ignition timing is retarded. More specifically, the reference ignition timing TIGIN in itself is set as the correction ignition timing TIG (see FIG. 6), and the routine is returned to step S180.

On the other hand, at step S330, since the knocking does not occur, a judgment is made as to whether or not the ignition timing (the correction ignition timing TIG) is a most-advanced angle TIGM. If an affirmative judgment is given here, the routine proceeds to step S340. If a negative judgment is given, the routine proceeds to step S350.

At step S340, since the correction ignition timing TIG is the most-advanced angle TIGM, a value of the most-advanced angle TIGM is set as a value of the correction ignition timing TIG, and the routine is returned to step S180.

On the other hand, at step S350, since the correction ignition timing TIG is not the most-advanced angle TIGM, the ignition timing is advanced by a predetermined value ΔTIG. More specifically, by subtracting the predetermined value (a correction advancing value) ΔTIG from the correction ignition timing TIG, this ignition timing is set as the correction ignition timing TIG this time, and the routine is returned to step S180.

<Knocking Detection Operation>

This operation is an operation in which the knocking is detected on the basis of the knocking signal. This process is performed at a predetermined time interval.

As shown in FIG. 8, at step S400, the knock detection flag KNS is cleared (is set to 0).

At subsequent step S410, a judgment is made as to whether or not this point (present time) is the ignition timing (whether or not this point (present time) is the timing at which the ignition signal is changed from the high level to the low level). If an affirmative judgment is given here, the routine proceeds to step S420. If a negative judgment is given, the present operation is temporarily terminated.

At step S420, a knock detection window measurement timer is started.

At subsequent step S430, a judgment is made as to whether or not this point (present time) is within a period corresponding to the knock detection window KNW calculated at step S250 (in other words, whether or not this point is in the knock detection window KNW) on the basis of a value of the knock window measurement timer. If an affirmative judgment is given here, the routine proceeds to step S440. If a negative judgment is given, the routine is returned to step S430 and the same operation is repeated.

At step S440, the knocking signal obtained from the knocking detection device 41 is set as a valid or effective signal.

At subsequent step S450, a judgment is made as to whether or not the period corresponding to the knock detection window KNW calculated at step S250 passes (or elapses) (in other words, whether or not this point is out of the knock detection window KNW) on the basis of the value of the knock window measurement timer. If an affirmative judgment is given here, the routine proceeds to step S460. If a negative judgment is given, the routine is returned to step S440 and the same operation is repeated.

At step S460, the knock window measurement timer is reset.

At subsequent step S470, a peak value KninPk of the knocking signal is calculated.

At subsequent step S480, a judgment is made as to whether or not the peak value KninPk of the knocking signal is greater than a predetermined judgment value (a predetermined criteria) Th that is set for judgment of the presence or absence of the knocking, namely that a judgment is made as to whether or not the knocking occurs. If an affirmative judgment is given here, the routine proceeds to step S490. If a negative judgment is given, the present operation is temporarily terminated.

At step S490, since the knocking occurs, the knock detection flag KNS is set (is set to 1), which indicates that the knocking occurs, and the present operation is terminated.

e) Next, effects of the present embodiment will be explained.

In the present embodiment, the ignition timing control device 31 is configured so that the knocking detection device 41 and the ignition timing adjustment device 43 are electrically connected and formed integrally with each other through the connecting cable 45. And also, the knocking signal is inputted to the ignition timing adjustment device 43 from the knocking detection device 41, and the reference ignition timing (the reference ignition signal) (A) is inputted to the ignition timing adjustment device 43 from the external internal combustion engine control device 37.

Therefore, the ignition timing adjustment device 43 can correct the ignition timing by advancing or retarding the ignition timing so as to achieve the proper ignition timing on the basis of the knocking signal obtained from the knocking detection device 41 and the reference ignition timing (the reference ignition signal) (A) obtained from the internal combustion engine control device 37.

Especially in the case of the ignition timing control device 31 of the present embodiment, the ignition timing control device 31 can be applied to an engine that is not undergone the knocking control such as the conventional general purpose engine and motorcycle engine. That is, only by adding the ignition timing control device 31 of the present embodiment to the conventional configuration of the electronic controller that performs the engine control, redesign to perform the ignition timing control in the internal combustion engine control device 37 is not required. This gives rise to significant effects of greatly reducing work (man-hour) and cost of the redesign.

Further, the configuration of the present embodiment can be achieved by fixing the knocking detection device 41 to the cylinder block 49 of the internal combustion engine 1 and electrically connecting the ignition timing adjustment device 43 and the internal combustion engine control device 37. Thus, also from the viewpoint of this configuration, this has the advantage of easily adding the ignition timing control device 31 to the conventional device configuration.

Furthermore, in the present embodiment, the knocking detection device 41 and the ignition timing adjustment device 43 are formed integrally with each other in the unseparatable (undetachable) manner. Thus, this configuration resists damage and handling becomes easy. Also, this configuration resists receiving external (or outside) noises.

Moreover, in the present embodiment, since the knocking detection device 41 and the ignition timing adjustment device 43 are formed integrally with each other through the connecting cable 45, it is possible to arrange the knocking detection device 41 and the ignition timing adjustment device 43 with these devices being separated from each other by a length of the connecting cable 45.

That is, in the present embodiment, the ignition timing adjustment device 43 can be arranged with the ignition timing adjustment device 43 being separated from the knocking detection device 41 that is fixed to the cylinder block 49. Influence of heat and vibration (of the engine body 3) on the ignition timing adjustment device 43 can therefore be reduced. Hence, it is possible to effectively suppress an occurrence of failure of the ignition timing adjustment device 43.

Embodiment 2

Next, an embodiment 2 will be explained. Regarding descriptions that are same as those of the embodiment 1, their explanations are omitted here.

Figure 9A:
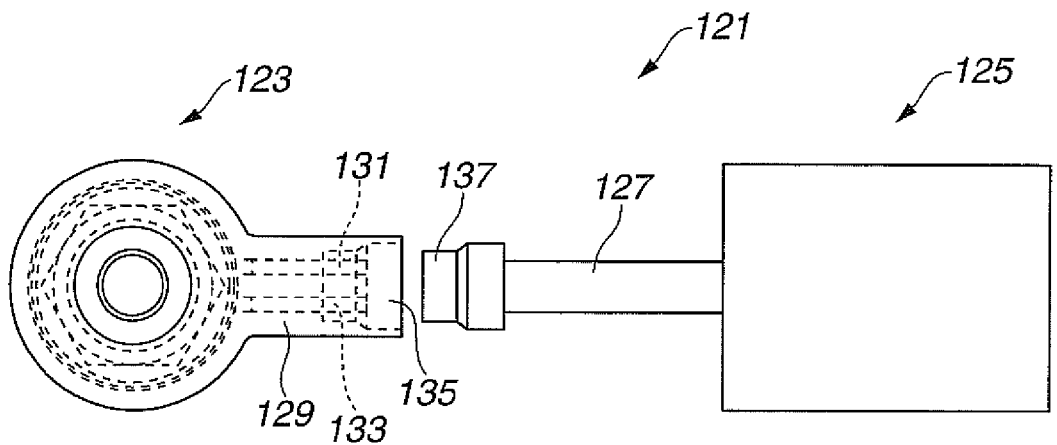
FIG. 9A is a plan view showing an ignition timing control device of an embodiment 2.

As shown in FIG. 9A, as same as the embodiment 1, an ignition timing control device 121 of the present embodiment is formed from a knocking detection device 123, an ignition timing adjustment device 125 and a connecting cable 127 (that connects these devices) which are fixedly connected each other.

Especially in the present embodiment, although the ignition timing adjustment device 125 and the connecting cable 127 are formed integrally with each other in the unseparatable (undetachable) manner, as shown in the drawing, the knocking detection device 123 and the connecting cable 127 are fixedly connected so as to be able to be attached to and detached from each other.

That is, a connecter portion 129 of the knocking detection device 123 is provided with a hollow portion 135 in which first and second output terminals 131, 133 are exposed, and this hollow portion 135 and a first connector portion 137 of the connecting cable 127 are connected so as to be able to be attached to and detached from each other. With this configuration, the knocking detection device 123 and the ignition timing adjustment device 125 are fixedly connected so as to be able to be attached to and detached from each other.

The present embodiment also has the same effects as the embodiment 1. Further, in the present embodiment, the knocking detection device 123 and the ignition timing adjustment device 125 are fixedly connected so as to be able to be attached to and detached from each other. Thus, in a case where either one of the knocking detection device 123 and the ignition timing adjustment device 125 fails, after detaching or separating these devices from each other, only the failed device can be replaced, which is advantage of the present embodiment.

Embodiment 3

Next, an embodiment 3 will be explained. Regarding descriptions that are same as those of the embodiment 2, their explanations are omitted here.

Figure 9B:
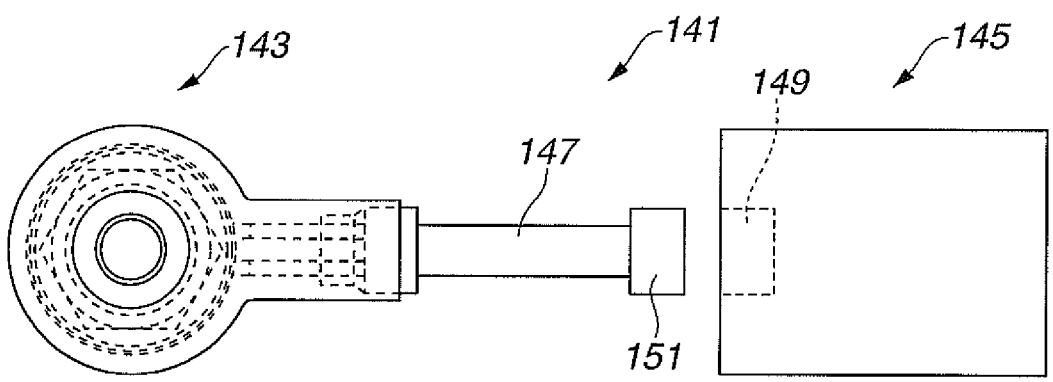
FIG. 9B is a plan view showing an ignition timing control device of an embodiment 3.

As shown in FIG. 9B, as same as the embodiment 1, an ignition timing control device 141 of the present embodiment is formed from a knocking detection device 143, an ignition timing adjustment device 145 and a connecting cable 147 (that connects these devices) which are fixedly connected each other.

Especially in the present embodiment, although the knocking detection device 143 and the connecting cable 147 are formed integrally with each other in the unseparatable (undetachable) manner, as shown in the drawing, the ignition timing adjustment device 145 and the connecting cable 147 are fixedly connected so as to be able to be attached to and detached from each other.

That is, the ignition timing adjustment device 145 is provided with a hollow-shaped connector portion 149, and this connector portion 149 and a second connector portion 151 of the connecting cable 147 are connected so as to be able to be attached to and detached from each other. With this configuration, the knocking detection device 143 and the ignition timing adjustment device 145 are fixedly connected so as to be able to be attached to and detached from each other.

The present embodiment also has the same effects as the embodiment 2.

Embodiment 4

Next, an embodiment 4 will be explained. Regarding descriptions that are same as those of the embodiment 2, their explanations are omitted here.

Figure 9C:
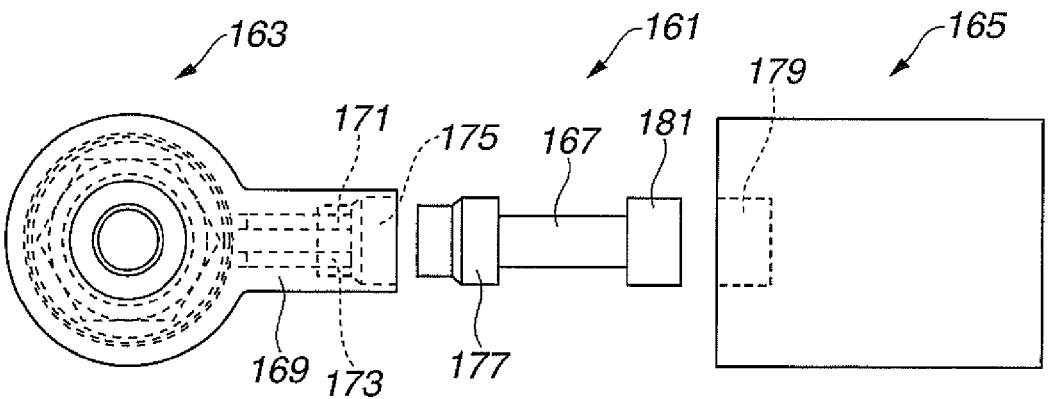
FIG. 9C is a plan view showing an ignition timing control device of an embodiment 4.

As shown in FIG. 9C, as same as the embodiment 1, an ignition timing control device 161 of the present embodiment is formed from a knocking detection device 163, an ignition timing adjustment device 165 and a connecting cable 167 (that connects these devices) which are fixedly connected each other.

Especially in the present embodiment, the knocking detection device 163 and the connecting cable 167 are fixedly connected so as to be able to be attached to and detached from each other. And also, the ignition timing adjustment device 165 and the connecting cable 167 are fixedly connected so as to be able to be attached to and detached from each other.

That is, as same as the embodiment 2, a connecter portion 169 of the knocking detection device 163 is provided with a hollow portion 175 in which first and second output terminals 171, 173 are exposed, and this hollow portion 175 and a first connector portion 177 of the connecting cable 167 are connected so as to be able to be attached to and detached from each other.

Further, the ignition timing adjustment device 165 is provided with a hollow-shaped connector portion 179, and this connector portion 179 and a second connector portion 181 of the connecting cable 167 are connected so as to be able to be attached to and detached from each other.

As described above, the ignition timing control device 161 of the present embodiment has a configuration in which the knocking detection device 163 and the ignition timing adjustment device 165 are fixedly connected so as to be able to be attached to and detached from each other.

The present embodiment also has the same effects as the embodiment 2.

Embodiment 5

Next, an embodiment 5 will be explained. Regarding descriptions that are same as those of the embodiment 1, their explanations are omitted here.

Figure 10A:
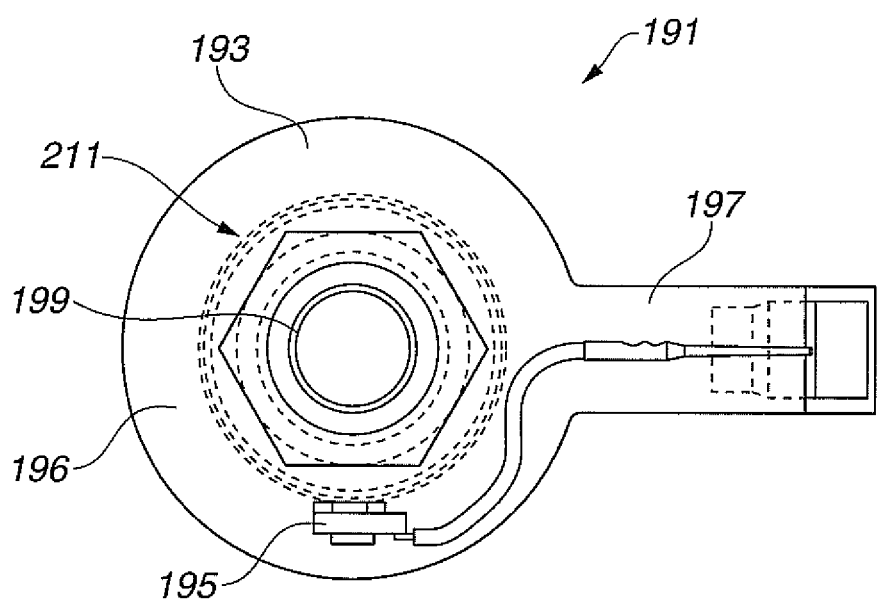
FIG. 10A is a plan view showing an ignition timing control device of an embodiment 5.
Figure 10B:
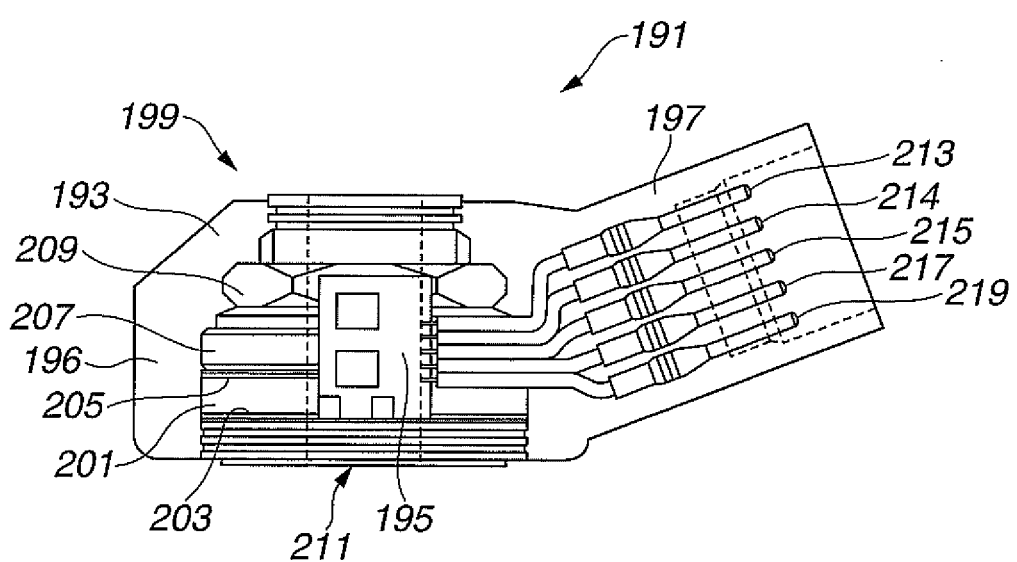
FIG. 10B is a front view of the ignition timing control device.

As shown in FIG. 10, as same as the embodiment 1, an ignition timing control device 191 of the present embodiment has a knocking detection device 193. However, the ignition timing control device 191 has no connecting cable, and an ignition timing adjustment device 195 is installed inside the knocking detection device 193. Here, FIG. 10 shows an inside configuration with a resin mold being transparent.

As will be explained in detail, as same as the embodiment 1, the ignition timing control device 191 of the present embodiment has a body portion 196 and a connector portion 197 of the knocking detection device 193. In addition, the ignition timing control device 191 accommodates, in a resin-molded inside of the body portion 196, a functioning portion 211 where a piezoelectric element 201, a pair of electrode plates 203, 205, a weight 207, a nut 209, etc. are fitted to a mount metal 199. Then, the ignition timing adjustment device 195 is disposed on a surface of this functioning portion 211.

Output terminals (not shown) that extend from the pair of electrode plates 203, 205 are connected to this ignition timing adjustment device 195. Further, the ignition timing adjustment device 195 is provided with an input terminal 213 that inputs the ignition signal (the reference ignition signal (A)) from the internal combustion engine control device, an output terminal 214 that outputs the signal indicating a failure (a defective condition) of the knocking detection device 193 or the ignition timing adjustment device 195 to the internal combustion engine control device, an output terminal 215 that outputs the ignition signal (the correction ignition signal (B)) to the igniter and a pair of power terminals 217, 219 that supply power to the ignition timing adjustment device 195, all of which extend from the ignition timing adjustment device 195.

The present embodiment also has the same effects as the embodiment 1. Further, the present embodiment has the advantage of forming the device into a compact shape.

Embodiment 6

Next, an embodiment 6 will be explained. Regarding descriptions that are same as those of the embodiment 1, their explanations are omitted here.

The present embodiment is an embodiment in which the present invention is applied to the general purpose engine and the engine revolution speed and the crank angle are determined using a magnet that rotates in synchronization with the revolution (rotation) of the engine.

Figure 11:
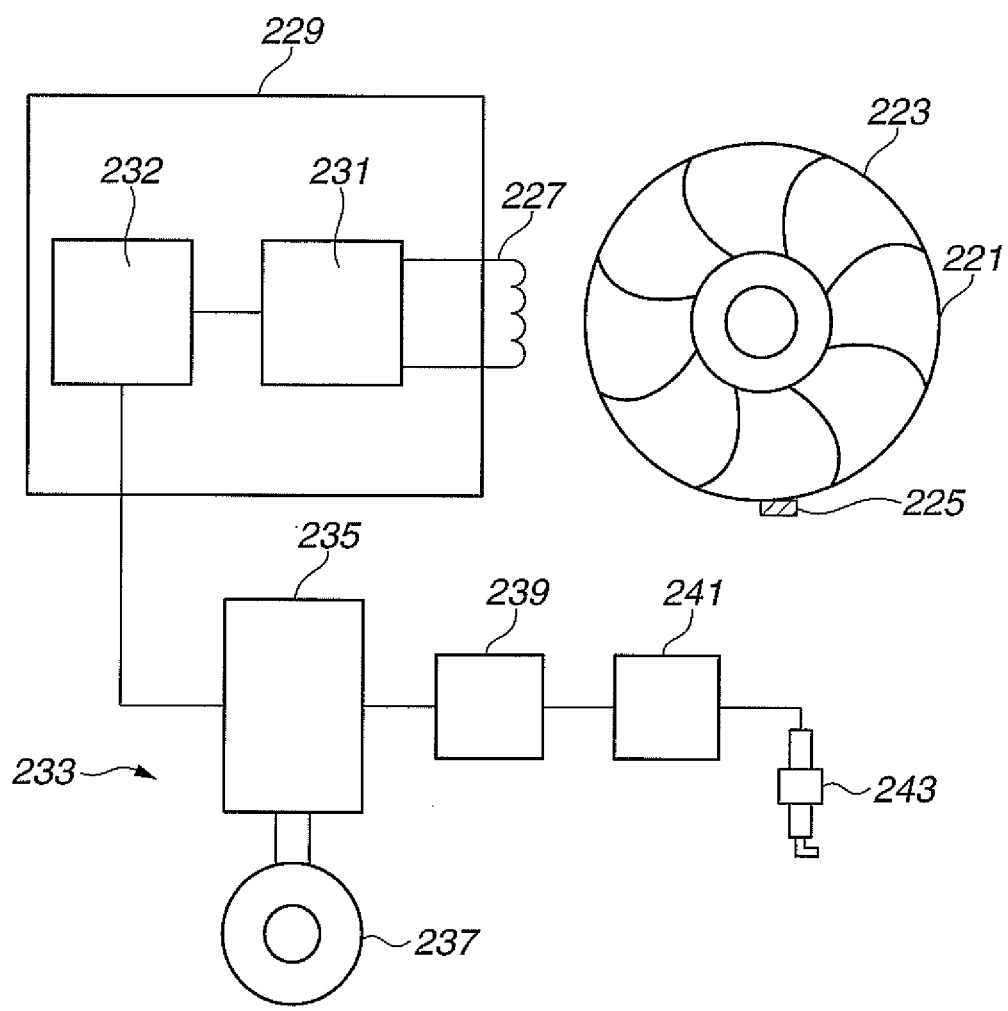
FIG. 11 is an explanatory drawing showing a system configuration including an ignition timing control device of an embodiment 6.

As shown in FIG. 11, in a system of the present embodiment, a flywheel 223 is secured to an output shaft 221 of the engine body, and a magnet 225 is fixed to an outer periphery of the flywheel 223.

In addition, the system is configured so that a pulser coil 227 that generates a signal (an AC signal) according to approach/separation of the magnet 225 is disposed in close proximity to the flywheel 223, and an output of the pulser coil 227 is inputted to an electronic control unit 229.

This electronic control unit 229 is provided with a detection circuit 231 that detects motion of the approach/separation of the magnet 225 on the basis of the signal obtained from the pulser coil 227, a well-known microcomputer 232 and the like.

Thus, since the signal can be obtained when the magnet 225 passes by the pulser coil 227, the crank angle that corresponds to a fixing position of the magnet 225 and the engine revolution speed can be determined from this signal. Accordingly, it is possible to set the reference ignition timing, for instance, according to the engine revolution speed.

Furthermore, in the present embodiment, an ignition timing control device 233, which is the same as that of the embodiment 1, is connected to the microcomputer 232 of the electronic control unit 229.

Therefore, when the ignition signal (the reference ignition signal (A)) outputted from the microcomputer 232 is inputted to an ignition timing adjustment device 235, the ignition timing adjustment device 235 performs the same adjustment of the ignition timing as that of the embodiment 1 in accordance with the occurrence state of the knocking detected by a knocking detection device 237.

Then, as same as the embodiment 1, the ignition signal (the correction ignition signal (B)) obtained by this adjustment is outputted to an igniter 239, and a high voltage is produced from an ignition coil 241 by function of the igniter 239, then spark occurs from an ignition plug 243 with a proper timing.

The present embodiment also has the same effects as the embodiment 1.

Here, unlike this system, as disclosed in, e.g. JP10-259777, a system, in which an ignition coil is arranged so as to be close to the magnet (that is fixed to the flywheel) which is same as that in the above system and the high voltage for actuating the ignition plug is produced by approach/separation of the magnet, could be possible.

Figure 12:
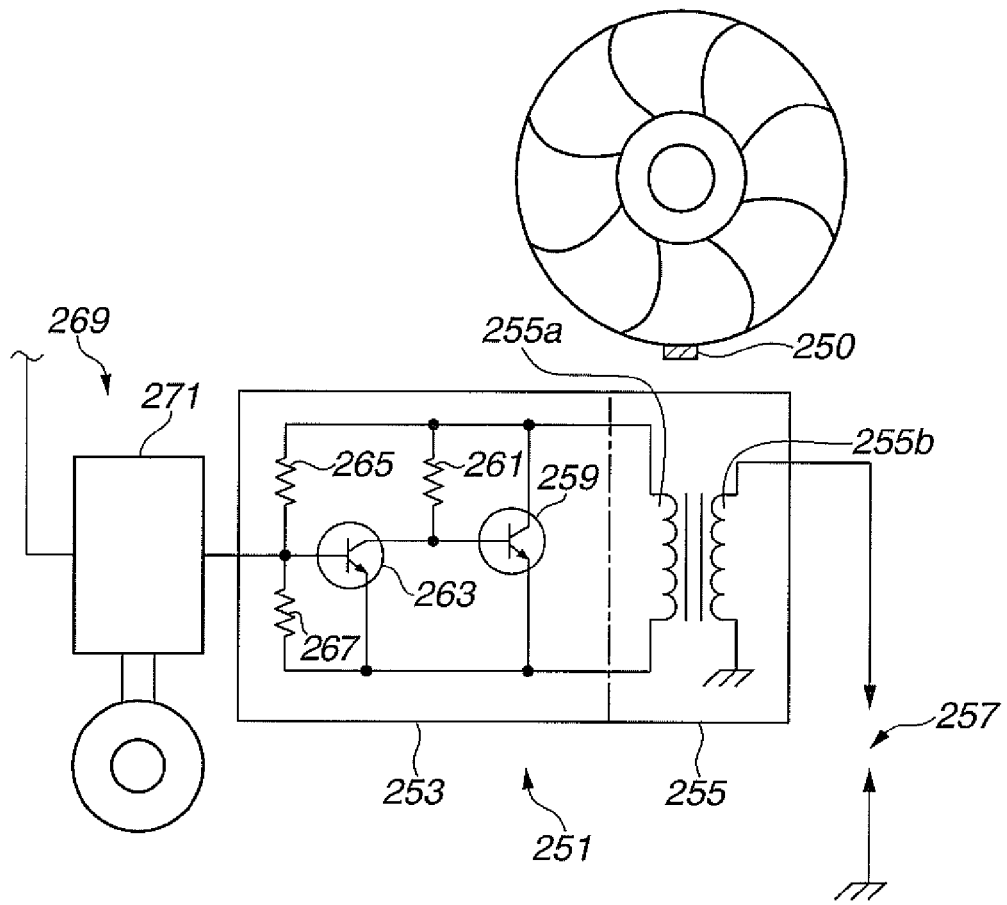
FIG. 12 is an explanatory drawing showing a system configuration of a modified example of the ignition timing control device of the embodiment 6.

In this case, an ignition drive circuit 251 as shown in FIG. 12 is used. This ignition drive circuit 251 has an igniter 253 and an ignition coil 255.

More specifically, the ignition coil 255 is formed from a primary winding 255a that generates current according to the approach/separation of a magnet 250 and a secondary winding 255b that is connected to an ignition plug 257.

The igniter 253 has a first transistor 259 whose collector is connected to one end of the primary winding 255a and whose emitter is connected to the other end of the primary winding 255a, a first resistance 261 that is connected between the collector and a base of the first transistor 259 and supplies a base power to the first transistor 259, a second transistor 263 whose collector is connected to the base of the first transistor 259 and whose emitter is connected to the emitter of the first transistor 259, and a second resistance 265 and a third resistance 267 that supply a base power to the base of the second transistor 263 with a voltage across the primary winding 255a divided.

Here, an ignition timing adjustment device 271 of an ignition timing control device 269 is connected to the base of the second transistor 263, and by the correction ignition signal (B) outputted from the ignition timing adjustment device 271 (that receives the reference ignition signal (A) from the electronic control unit 229), the ignition timing can be adjusted, as same as the embodiment 1.

Embodiment 7

Next, an embodiment 7 will be explained. Regarding descriptions that are same as those of the embodiment 1, their explanations are omitted here.

The embodiment 7 is quite different from the embodiment 1 in the ignition signal (A) and the control using the ignition signal (A).

a) First, a basis configuration of the embodiment 7 will be explained.

Figure 13:
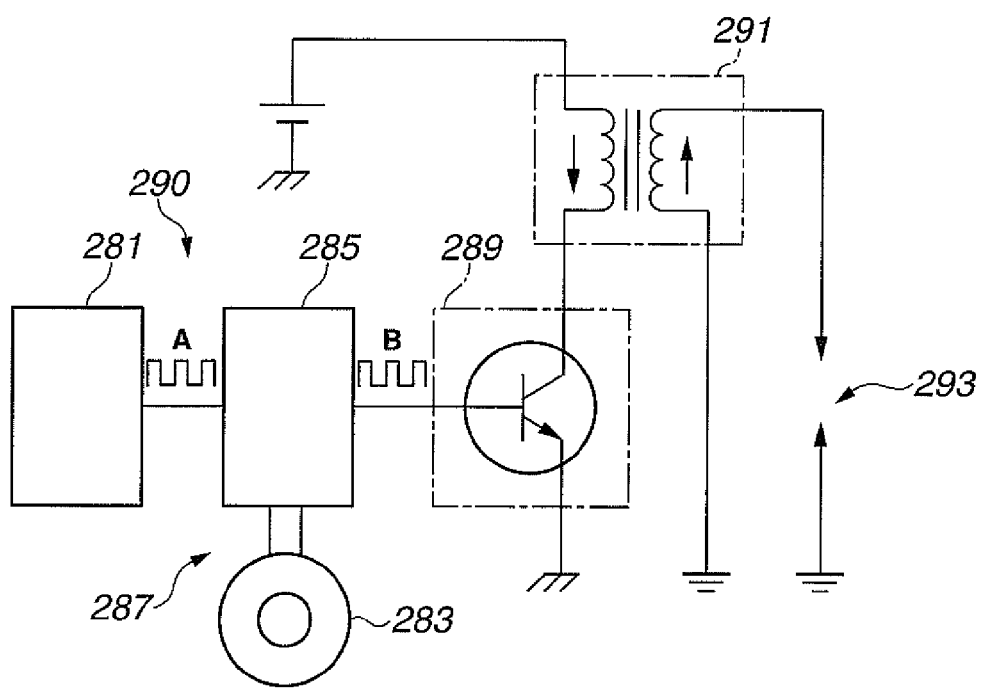
FIG. 13 is an explanatory drawing showing an electrical configuration of an ignition timing control device and its peripheral devices of an embodiment 7.

As shown in FIG. 13, in a system of the embodiment 7, as same as the embodiment 1, an internal combustion engine control device 281, an ignition timing control device 287 (that is formed from a knocking detection device 283 and an ignition timing adjustment device 285), an igniter 289, an ignition coil 291, an ignition plug 293, etc. are provided. The reference ignition signal (the ignition signal (A)) including the information of the ignition timing is sent from the internal combustion engine control device 281 to the ignition timing adjustment device 285, and the ignition signal (B) is sent from the ignition timing adjustment device 285 to the igniter 289.

Here, an ignition timing control system 290 is formed from the internal combustion engine control device 281 and the ignition timing control device 287 (the other configuration is same as the embodiment 1).

Especially in the present embodiment 7, a judgment about whether the ignition timing for the internal combustion engine 1 is adjusted (i.e. is advanced) is made in the internal combustion engine control device 281, and the ignition signal (A) based on the judgment is sent to the ignition timing adjustment device 285.

Here, for instance, in a case where temperature of cooling water is excessively high, if the ignition timing is advanced, the knocking tends to occur. Thus, the advancing of the ignition timing is prohibited for such period (in a condition in which the knocking tends to occur).

Figure 14A:
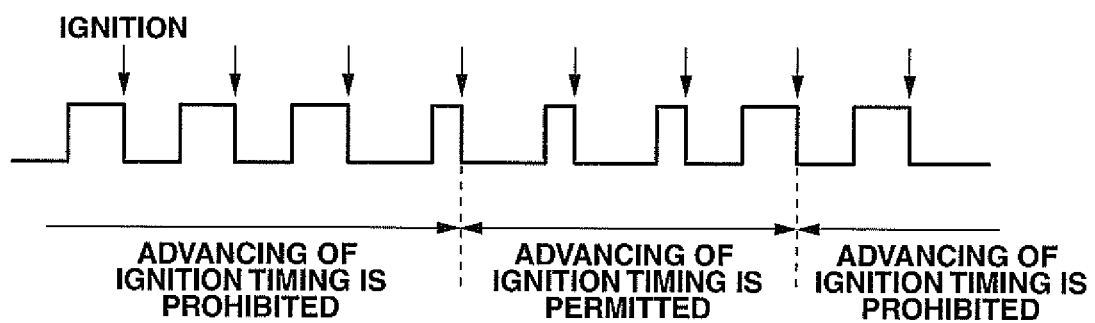
FIG. 14A is an explanatory drawing showing a signal that indicates prohibition and permission of advancing of the ignition timing, used in the embodiment 7.

More specifically, in the embodiment 7, as shown in FIG. 14A, during the period for which the advancing of the ignition timing is prohibited, a width of the pulse-shaped ignition signal (A) is set to be long (wide) (namely that a period (or a length or a duration time) of the high level of the pulse-shaped signal at each time is set to be long). And, during a period for which the advancing of the ignition timing is permitted, the width of the ignition signal (A) is set to be short (narrow) (namely that the period (or the length or a duration time) of the high level of the signal at each time is set to be short).

Therefore, the ignition timing adjustment device 285 that receives this ignition signal (A) can judge whether the advancing of the ignition timing is prohibited or permitted by checking the width of the ignition signal (A).

When the advancing of the ignition timing is prohibited, the ignition signal (B) that indicates the reference ignition timing is outputted to the igniter 289.

On the other hand, when judged that the advancing of the ignition timing is permitted, as same as the embodiment 1, the ignition timing is gradually advanced on the basis of the knocking signal etc. (in a case where the advancing of the ignition timing is proper), but in a case where the advancing of the ignition timing is not proper, the control is performed so as to return the ignition timing to the reference ignition timing.

b) Next, a control operation of the embodiment 7 will be explained.

Figure 15:
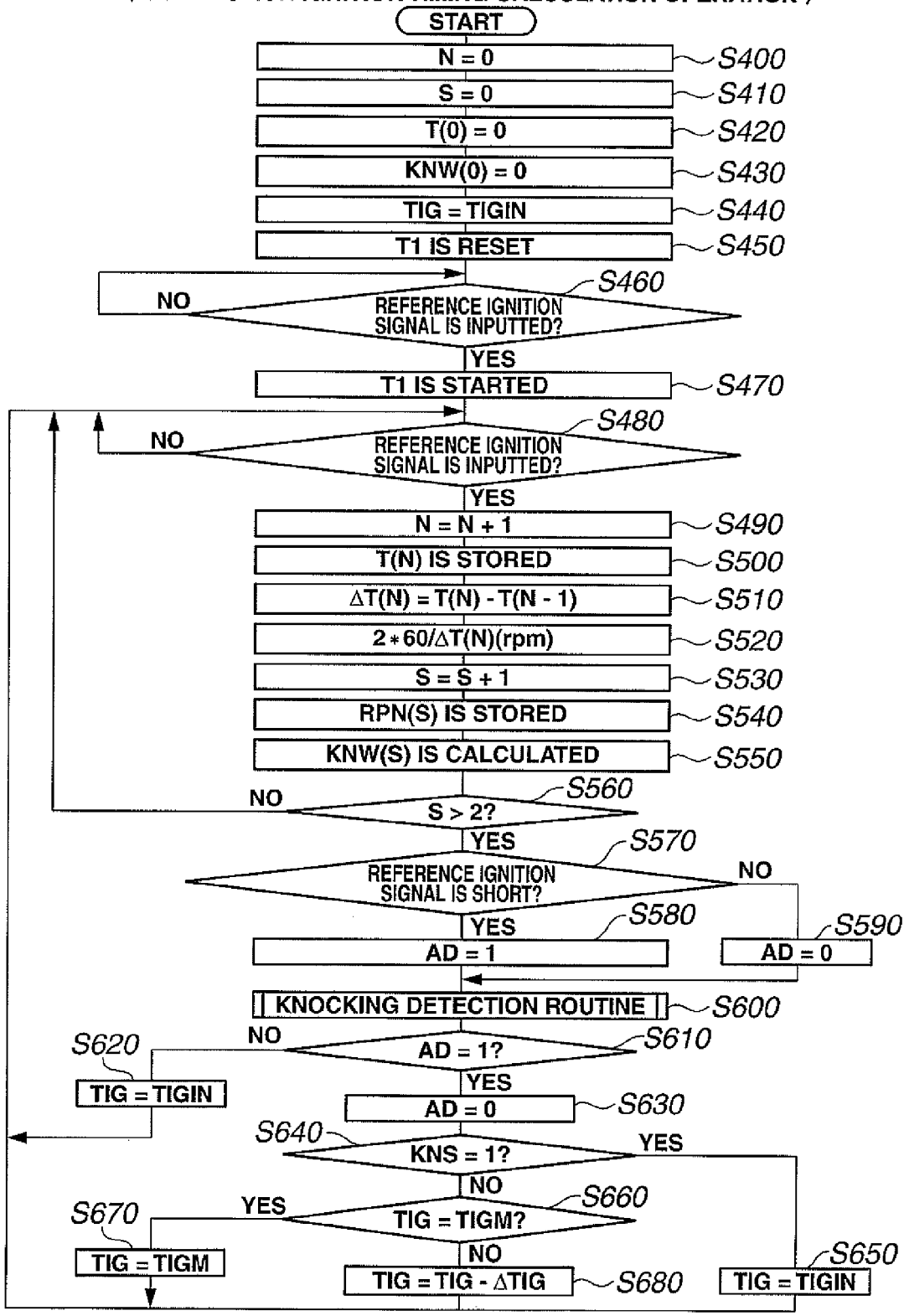
FIG. 15 is a flow chart showing a correction ignition timing calculating operation executed in an ignition timing adjustment device of the embodiment 7.

As shown in a flow chart of FIG. 15, in the present embodiment 7, operations at steps S400~S550 are same as those at steps S100~S250 in the embodiment 1. Thus their explanations are omitted here.

At subsequent step S560, a judgment is made as to whether or not the revolution speed store/knock window variable S is greater than 2. If an affirmative judgment is given here, the routine proceeds to step S570. If a negative judgment is given, the routine is returned to step S480.

At step S570, a judgment is made as to whether or not the reference ignition signal (the ignition signal (A)) is a signal whose width is shorter (narrower) than a width of a signal of the case where the advancing of the ignition timing is prohibited, namely that a judgment is made as to whether or not the advancing of the ignition timing is permitted. If an affirmative judgment is given here, the routine proceeds to step S580. If a negative judgment is given, the routine proceeds to step S590.

At step S580, since the advancing of the ignition timing is permitted, a flag AD is set to 1, and the routine proceeds to step S600.

On the other hand, at step S590, since the advancing of the ignition timing is prohibited, the flag AD is set to 0, and the routine proceeds to step S600.

At step S600, the same knocking detection operation as that of the embodiment 1 is executed (see FIG. 8), and the knocking is detected.

At subsequent step S610, a judgment is made as to whether or not the flag AD is 1. If an affirmative judgment is given here, the routine proceeds to step S630. If a negative judgment is given, the routine proceeds to step S620.

At step S620, since the control for advancing the ignition timing is prohibited, the reference ignition timing TIGIN in itself is set as the correction ignition timing TIG, and the routine is returned to step S480.

On the other hand, at step S630, the flag AD is set to 0.

At subsequent step S640, since the control for advancing the ignition timing is not prohibited, a judgment is made as to whether or not the knocking occurs according to whether or not the knock detection flag KNS that is set in the knocking detection operation is 1. If an affirmative judgment is given here, the routine proceeds to step S650. If a negative judgment is given, the routine proceeds to step S660.

At step S650, since the knocking occurs, in order to prevent the occurrence of the knocking, the ignition timing is retarded, and the routine is returned to step S480. More specifically, at step S650, the reference ignition timing TIGIN in itself is set as the correction ignition timing TIG.

On the other hand, at step S660, since the knocking does not occur, a judgment is made as to whether or not the ignition timing (the correction ignition timing TIG) is the most-advanced angle TIGM. If an affirmative judgment is given here, the routine proceeds to step S670. If a negative judgment is given, the routine proceeds to step S680.

At step S670, since the correction ignition timing TIG is the most-advanced angle TIGM, a value of the most-advanced angle TIGM is set as a value of the correction ignition timing TIG, and the routine is returned to step S480.

On the other hand, at step S680, since the correction ignition timing TIG is not the most-advanced angle TIGM, the ignition timing is advanced by a predetermined value LTIG, and the routine is returned to step S480.

The operations at steps S620, S640~S680 are the same as those in the embodiment 1.

c) Next, effects of the present embodiment will be explained.

In the embodiment 7, by changing the width of the ignition signal (A) (the period (or the length) of the high level of the signal) which is sent from the internal combustion engine control device 281 to the ignition timing adjustment device 285, information about whether this point (present time) is in the prohibition timing or the permission timing of the advancing of the ignition timing can be sent to the ignition timing adjustment device 285.

Therefore, since the ignition timing adjustment device 285 understands about whether this point (present time) is in the prohibition timing or the permission timing of the advancing of the ignition timing from the change of the width of the ignition signal (A)), it is possible to perform the control of the advancing of the ignition timing without the occurrence of the knocking only in the proper timing for which the knocking does not tend to occur (i.e. only in the period in which the control of the advancing of the ignition timing is allowed).

Further, as the information of the prohibition timing or the permission timing of the advancing of the ignition timing, it is only the change of the width of the ignition signal (A). Thus, this has the considerable advantage of eliminating the need to change a hardware configuration.

Figure 14B:
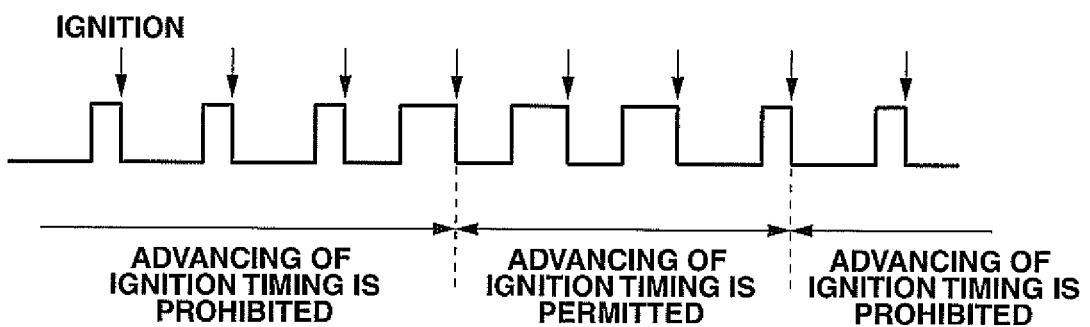
FIG. 14B is an explanatory drawing showing a signal that indicates prohibition and permission of advancing of the ignition timing, used in a modified example of the embodiment 7.

Here, in the present embodiment 7, in the case where the advancing of the ignition timing is permitted, the width of the ignition signal (A) is set to be short (narrow). However, as a modified example, as shown in FIG. 14B, in the case where the advancing of the ignition timing is permitted, the width of the ignition signal (A) could be set to be wider (namely that the period (or the duration time) of the high level could be set to be longer) than that of the case where the advancing of the ignition timing is prohibited, which is an opposite manner to FIG. 14A.

Embodiment 8

Next, an embodiment 8 will be explained. Regarding descriptions that are same as those of the embodiment 7, their explanations are omitted here.

Figure 16:
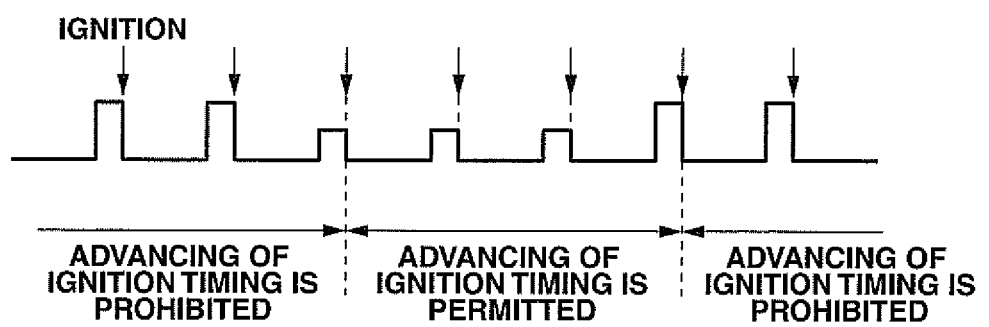
FIG. 16 is an explanatory drawing showing a signal that indicates prohibition and permission of advancing of the ignition timing, used in an embodiment 8.

In the embodiment 7, to transmit the information of the prohibition/permission of the advancing of the ignition timing, the width of the ignition signal (A) is changed. In the present embodiment 8, as shown in FIG. 16, a magnitude or level of voltage of the ignition signal (A) (a height of the high level of the signal) is changed.

That is, the voltage (the height) of the ignition signal (A) is set so that when the advancing of the ignition timing is prohibited, the height is high, and when the advancing of the ignition timing is permitted, the height is low.

In the following description, a system configuration of the present embodiment 8 will be explained.

Figure 17A:
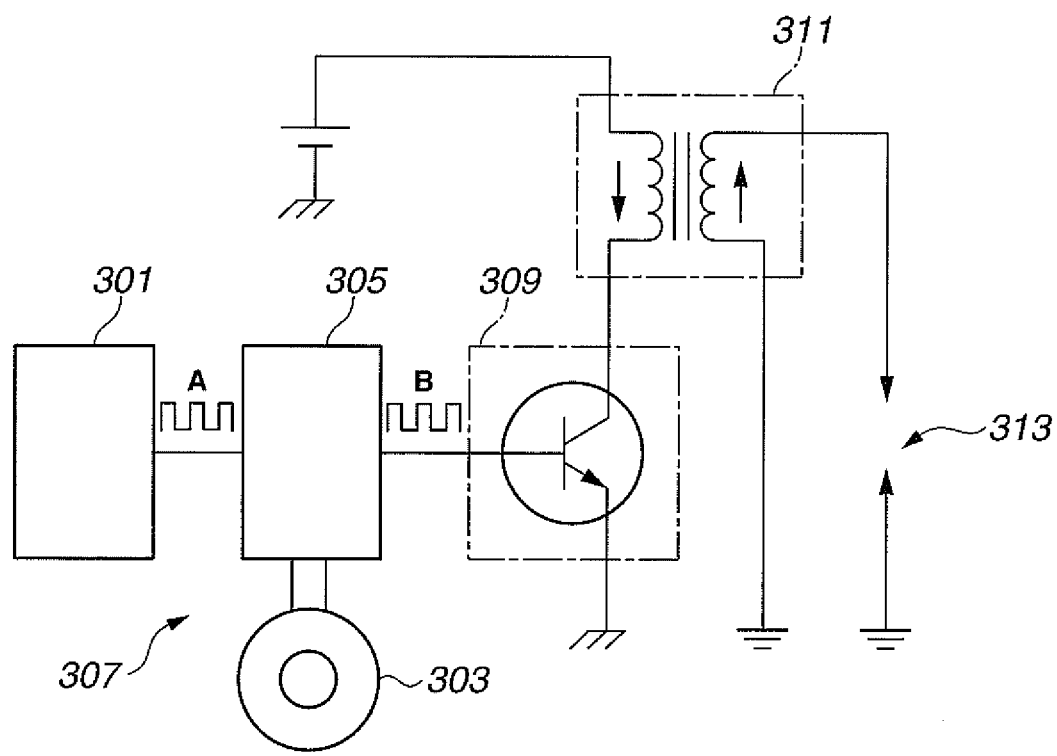
FIG. 17A is an explanatory drawing showing an electrical configuration of an ignition timing control device and its peripheral devices of the embodiment 8.

As shown in FIG. 17A, in a system of the embodiment 8, as same as the embodiment 7, an internal combustion engine control device 301, an ignition timing control device 307 (that is formed from a knocking detection device 303 and an ignition timing adjustment device 305), an igniter 309, an ignition coil 311, an ignition plug 313, etc. are provided.

Figure 17B:
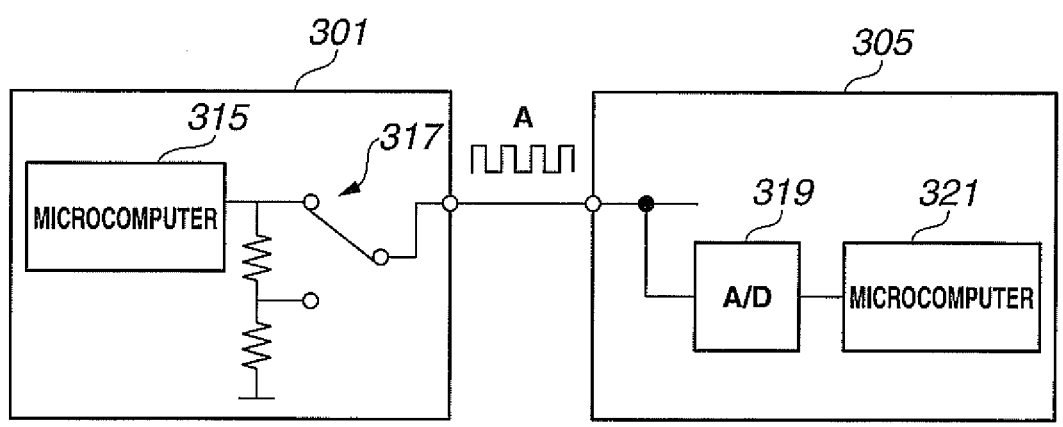
FIG. 17B is an explanatory drawing showing a configuration to send and receive an ignition signal A.

Further, as shown in FIG. 17B, the internal combustion engine control device 301 has a switching circuit 317 that switches the voltage of the ignition signal (A) (the height of the signal) which is outputted from a microcomputer 315 to the ignition timing adjustment device 305 between two levels of a high voltage (e.g. 5V) and a low voltage (e.g. 3V).

On the other hand, the ignition timing adjustment device 305 has an A/D converter 319 that inputs the ignition signal (A) and a microcomputer 321 that inputs a signal from the A/D converter 319.

Thus, in the present embodiment 8, a judgment about whether the operating condition of the internal combustion engine 1 is in a state in which the advancing of the ignition timing is prohibited or a state in which the advancing of the ignition timing is permitted is made in the internal combustion engine control device 301, and the voltage of the ignition signal (A) is adjusted on the basis of this judgment result.

For example, a control is executed so that when the operating condition is in the state in which the advancing of the ignition timing is prohibited, the ignition signal (A) having the voltage of 5V is outputted by the switching circuit 317, and when the operating condition is in the state in which the advancing of the ignition timing is permitted, the ignition signal (A) having the voltage of 3V is outputted by the switching circuit 317.

In the ignition timing adjustment device 305 that receives this ignition signal (A), the microcomputer 321 inputs the ignition signal (A) through the A/D converter 319, and its voltage is judged, then the judgment about whether the operating condition is in the state in which the advancing of the ignition timing is prohibited or the state in which the advancing of the ignition timing is permitted can be made according to the height of the judged voltage.

After the judgment, as same as the embodiment 7 (or the modified example), by outputting the ignition signal (B) according to the knocking signal etc., the ignition timing can be properly controlled.

Here, in the embodiment 8, in the case where the advancing of the ignition timing is permitted, the voltage of the ignition signal (A) is set to be low. However, as a modified example, as an opposite manner, in the case where the advancing of the ignition timing is permitted, the voltage of the ignition signal (A) could be set to be high (as compared with the case where the advancing of the ignition timing is prohibited).

Embodiment 9

Next, an embodiment 9 will be explained. Regarding descriptions that are same as those of the embodiment 7, their explanations are omitted here.

In the embodiment 7, the information of the prohibition/permission of the advancing of the ignition timing is transmitted using the ignition signal (A). In the present embodiment 9, the information is transmitted using other signal line.

Figure 18:
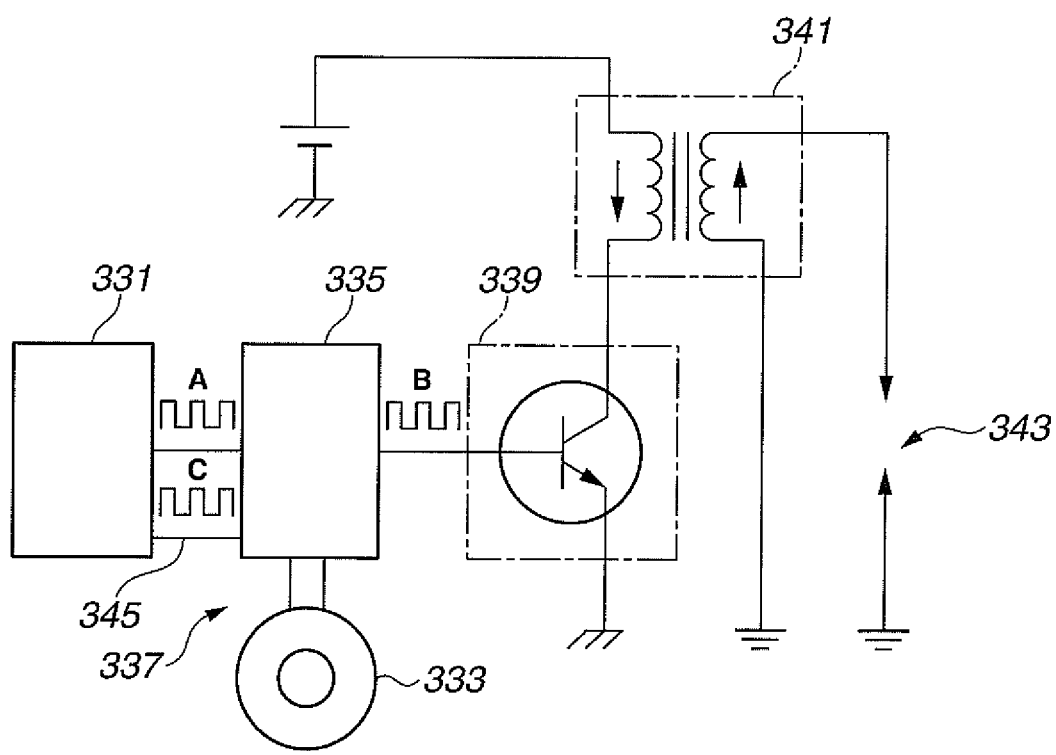
FIG. 18 is an explanatory drawing showing an electrical configuration of an ignition timing control device and its peripheral devices of an embodiment 9.

As will be explained in detail, as shown in FIG. 18, in a system of the embodiment 9, as same as the embodiment 7, an internal combustion engine control device 331, an ignition timing control device 337 (that is formed from a knocking detection device 333 and an ignition timing adjustment device 335), an igniter 339, an ignition coil 341, an ignition plug 343, etc. are provided.

Further, in the present embodiment 9, a judgment signal line 345 that connects the internal combustion engine control device 331 and the ignition timing adjustment device 335 of the ignition timing control device 337 is provided.

Then, using the judgment signal line 345, a signal (a judgment signal (C)) that indicates whether the operating condition of the internal combustion engine 1 is in the state in which the advancing of the ignition timing is prohibited or the state in which the advancing of the ignition timing is permitted is sent from the internal combustion engine control device 331 to the ignition timing adjustment device 335.

For example, only in the case where the operating condition of the internal combustion engine 1 is in the state in which the advancing of the ignition timing is permitted, for instance, the pulse-shaped judgment signal C could be sent. Or, as an opposite manner, only in the case where the advancing of the ignition timing is prohibited, the judgment signal (C) could be sent.

With this configuration, since the ignition timing adjustment device 335 understands about whether the operating condition of the internal combustion engine 1 is in the state in which the advancing of the ignition timing is prohibited or the state in which the advancing of the ignition timing is permitted, by outputting the ignition signal (B) according to this understanding, the ignition timing can be properly controlled.

Embodiment 10

Next, an embodiment 10 will be explained. Regarding descriptions that are same as those of the embodiment 7~9, their explanations are omitted here.

In the embodiment 7~9, the ignition signal (B) is sent from the ignition timing control device to the igniter on the basis of the ignition signal (A) or the judgment signal (C) which is sent from the internal combustion engine control device to the ignition timing control device. In the present embodiment 10, in a case where a predetermined condition is satisfied, the ignition signal (A) is used as it is, and is outputted as the ignition signal (B) from the ignition timing control device to the igniter.

More specifically, as will be explained using, for instance, FIG. 13, in the case where the operating condition of the internal combustion engine 1 is in the state in which the advancing of the ignition timing is prohibited, the ignition signal (A) (or the judgment signal (C)) that includes its information is outputted from the internal combustion engine control device 281 to the ignition timing control device 287 (more specifically, the ignition timing adjustment device 285).

Therefore, since the ignition timing adjustment device 285 that receives the signal understands that the operating condition is in the state in which the advancing of the ignition timing is prohibited, in this case, the ignition signal (A) is used as it is (the ignition signal (A) passes through the ignition timing adjustment device 285), and is outputted as the ignition signal (B) to the igniter 289.

Here, in this case, a pulse width of the ignition signal (A) is previously set to a value that corresponds to a time for which magnetic energy allowing the ignition plug to ignite is stored.

In the present embodiment 10, there is no need to newly generate the ignition signal (B), thereby gaining the advantage of reducing a load of the control operation.

The present invention is not limited to the above embodiments, and variations of the present invention can occur.

(1) For instance, the knocking detection device is not limited to the non-resonant type knocking sensor, and a resonant type knocking sensor can be used. As long as a device can detect the knocking, any device can be used.

(2) In addition, regarding the manner of detecting the knocking, the manner is not limited to the manner of detecting the knocking from the peak of the knocking signal. As long as the knocking can be detected, any manner, e.g. a manner using an integration value, can be used.

(3) Furthermore, the present invention can be applied to a two-cycle engine.

(4) As the external electronic control unit of the present invention, it could be a device that performs each control by the microcomputer. Further, it could be an internal combustion engine control device that is provided as a different device from the ignition timing control device (through a detachable lead line) and controls the operation of the internal combustion.

(5) In the case where the operating condition of the internal combustion engine is in the state in which the advancing of the ignition timing is prohibited, since the knocking signal is not used, the configuration could be set so that the knocking signal is not inputted to the ignition timing adjustment device 285.

EXPLANATION OF REFERENCE SIGN

1: internal combustion engine
3: engine body
25, 243, 257, 293, 313, 343: ignition plug
31, 121, 141, 161, 191, 233, 269, 287, 307, 337: ignition timing control device
33, 239, 253, 289, 309, 339: igniter 35, 241, 255, 291, 311, 341: ignition coil
37, 281, 301, 331: internal combustion engine control device
41, 123, 143, 163, 193, 237, 283, 303, 333: knocking detection device
43, 125, 145, 165, 195, 235, 271, 285, 305, 335: ignition timing adjustment device
45, 127, 147, 167: connecting cable

The invention claimed is:

1. An ignition timing control device comprising:
a knocking detection device that detects knocking of an internal combustion engine, the knocking detection device having a piezoelectric element; and
an ignition timing adjustment device that adjusts an ignition timing of the internal combustion engine on the basis of a knocking signal indicating a knocking state which is obtained from the knocking detection device and a signal concerning the ignition timing of the internal combustion engine which is obtained from an external electronic control unit, the knocking signal being output through the piezoelectric element,
the knocking detection device and the ignition timing adjustment device being electrically connected and formed integrally with each other, and
the ignition timing adjustment device being configured to receive a signal including information about whether the adjustment of the ignition timing is permitted from the external electronic control unit, and judge on the basis of the signal whether or not the adjustment of the ignition timing is performed.

2. The ignition timing control device as claimed in claim 1, wherein:
the knocking detection device and the ignition timing adjustment device are formed integrally with each other in an unseparatable manner.

3. The ignition timing control device as claimed in claim 1, wherein:
the knocking detection device and the ignition timing adjustment device are fixedly connected so as to be able to be attached to and detached from each other.

4. The ignition timing control device as claimed in claim 1, wherein:
the knocking detection device and the ignition timing adjustment device are formed integrally with each other through a connecting cable.

5. The ignition timing control device as claimed in claim 1, wherein:
the ignition timing adjustment device is installed in the knocking detection device.

6. The ignition timing control device as claimed in claim 1, wherein:
the signal concerning the ignition timing is a reference ignition signal indicating a timing that is a reference of the ignition timing.

7. The ignition timing control device as claimed in claim 1, wherein:
the signal concerning the ignition timing of the internal combustion engine which is sent from the external electronic control unit to the ignition timing adjustment device includes the information about whether the adjustment of the ignition timing is permitted.

8. The ignition timing control device as claimed in claim 7, wherein:
the signal concerning the ignition timing of the internal combustion engine is a signal that indicates, by change of a status of the signal in itself, whether the adjustment of the ignition timing is permitted.

9. The ignition timing control device as claimed in claim 8, wherein:
the change of the status of the signal concerning the ignition timing of the internal combustion engine is change of a duration time of a high level or a low level of the signal.

10. The ignition timing control device as claimed in claim 8, wherein:
the change of the status of the signal concerning the ignition timing of the internal combustion engine is change of voltage of the signal.

11. The ignition timing control device as claimed in claim 1, wherein:
besides a signal line for sending the signal concerning the ignition timing of the internal combustion engine from the external electronic control unit, a judgment signal line for sending a judgment signal that indicates whether the adjustment of the ignition timing is permitted from the external electronic control unit is connected to the ignition timing adjustment device.

12. The ignition timing control device as claimed in claim 1, wherein:
in a case where the ignition timing adjustment device judges, on the basis of the signal including the information about whether the adjustment of the ignition timing is permitted which is received from the external electronic control unit, that there is no need to adjust the ignition timing, the ignition timing adjustment device performs a control of the ignition timing of the internal combustion engine using the signal concerning the ignition timing of the internal combustion engine obtained from the external electronic control unit.

13. An ignition timing control system provided with an ignition timing control device and an external electronic control unit, wherein:
the ignition timing control device including:
a knocking detection device that detects knocking of an internal combustion engine, the knocking detection device having a piezoelectric; and
an ignition timing adjustment device that adjusts an ignition timing of the internal combustion engine on the basis of a knocking signal indicating a knocking state which is obtained from the knocking detection device and a signal concerning the ignition timing of the internal combustion engine which is obtained from the external electronic control unit, the knocking signal being output through the piezoelectric element,
the knocking detection device and the ignition timing adjustment device are electrically connected and formed integrally with each other,
the ignition timing adjustment device is configured to receive a signal including information about whether the adjustment of the ignition timing is permitted from the external electronic control unit, and judge on the basis of the signal whether or not the adjustment of the ignition timing is performed,
the external electronic control unit includes:
a judging unit that judges whether or not an operating condition of the internal combustion engine is in a timing in which the adjustment of the ignition timing is permitted; and
a transmitting unit that, when the judgment as to whether or not the operating condition is in the timing in which the adjustment of the ignition timing is permitted is made by the judging unit, transmits a signal that includes information indicating whether the operating condition is in the timing in which the adjustment of the ignition timing is permitted to the ignition timing adjustment device.

14. The ignition timing control system as claimed in claim 13, wherein:
the signal concerning the ignition timing of the internal combustion engine which is sent from the external electronic control unit to the ignition timing adjustment device includes the information about whether the adjustment of the ignition timing is permitted.

15. The ignition timing control system as claimed in claim 14, wherein:
the signal concerning the ignition timing of the internal combustion engine is a signal that indicates, by change of a status of the signal in itself, whether the adjustment of the ignition timing is permitted.

16. The ignition timing control system as claimed in claim 15, wherein:
the change of the status of the signal concerning the ignition timing of the internal combustion engine is change of a duration time of a high level or a low level of the signal.

17. The ignition timing control system as claimed in claim 15, wherein:
the change of the status of the signal concerning the ignition timing of the internal combustion engine is change of voltage of the signal.

18. The ignition timing control device as claimed in claim 13, wherein:
besides a signal line for sending the signal concerning the ignition timing of the internal combustion engine from the external electronic control unit, a judgment signal line for sending a judgment signal that indicates whether the adjustment of the ignition timing is permitted from the external electronic control unit is connected to the ignition timing adjustment device.

19. The ignition timing control system as claimed in claim 13, wherein:
in a case where the ignition timing adjustment device judges, on the basis of the signal including the information about whether the adjustment of the ignition timing is permitted which is received from the external electronic control unit, that there is no need to adjust the ignition timing, the ignition timing adjustment device performs a control of the ignition timing of the internal combustion engine using the signal concerning the ignition timing of the internal combustion engine obtained from the external electronic control unit.

\* \* \* \* \*